United States Patent
Naitou et al.

(10) Patent No.: US 10,337,808 B2
(45) Date of Patent: Jul. 2, 2019

(54) CONDENSER

(71) Applicant: DENSO CORPORATION, Kariya, Aichi-pref. (JP)

(72) Inventors: Kazuhisa Naitou, Kariya (JP); Takeshi Okinotani, Kariya (JP); Etsuo Hasegawa, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 330 days.

(21) Appl. No.: 15/307,421

(22) PCT Filed: Jun. 29, 2015

(86) PCT No.: PCT/JP2015/003247
§ 371 (c)(1),
(2) Date: Oct. 28, 2016

(87) PCT Pub. No.: WO2016/002187
PCT Pub. Date: Jan. 7, 2016

(65) Prior Publication Data
US 2017/0050489 A1    Feb. 23, 2017

(30) Foreign Application Priority Data
Jun. 30, 2014  (JP) ................................. 2014-133727

(51) Int. Cl.
*F28F 9/26*      (2006.01)
*B60H 1/00*     (2006.01)
(Continued)

(52) U.S. Cl.
CPC ............ *F28F 9/26* (2013.01); *B60H 1/00328* (2013.01); *F25B 39/00* (2013.01); *F25B 39/04* (2013.01);
(Continued)

(58) Field of Classification Search
CPC ... F28F 9/26; F25B 2400/23; F25B 2339/044; F25B 2339/0443; F25B 2339/0442;
(Continued)

(56) References Cited

FOREIGN PATENT DOCUMENTS

DE    102011113453 A1 *  3/2012  .............. F25B 39/04
GB    362781 A       * 12/1931  .............. F25B 39/04
(Continued)

*Primary Examiner* — Devon Russell
(74) *Attorney, Agent, or Firm* — Harness, Dickey & Pierce, P.L.C.

(57) ABSTRACT

A condenser has a core part having tubes, a first modulator tank and a second modulator tank. The first modulator tank is provided along a side portion of a header tank. The second modulator tank communicates with an interior of the first modulator tank and is provided along a lower edge of the core part in a gravity direction. An interior of the header tank is provided with a communicating space that communicates with the interior of the first modulator tank and an interior of the second modulator tank. The header tank has an introduction passage that guides liquid-phase refrigerant in the communicating space to a supercooling portion of the core part. A first connection part between the communicating space and the introduction passage is disposed on a lower side, in the gravity direction, of a second connection part between the communicating space and the second modulator tank.

16 Claims, 15 Drawing Sheets

(51) Int. Cl.
*F25B 39/04* (2006.01)
*F25B 39/00* (2006.01)
*F28D 1/053* (2006.01)
*F25B 40/02* (2006.01)
*F28D 21/00* (2006.01)

(52) U.S. Cl.
CPC .......... *F28D 1/05391* (2013.01); *F25B 40/02* (2013.01); *F25B 2339/0441* (2013.01); *F28D 2021/0063* (2013.01); *F28D 2021/0084* (2013.01)

(58) Field of Classification Search
CPC .. F25B 2339/0441; F25B 40/02; F25B 39/04; F25B 39/00; F28D 1/05391; B60H 1/00328
See application file for complete search history.

(56) References Cited

FOREIGN PATENT DOCUMENTS

| | | | | | |
|---|---|---|---|---|---|
| JP | 2000274883 | A | * | 10/2000 | ............. F25B 39/04 |
| JP | 2001108331 | A | * | 4/2001 | ............. F25B 39/04 |
| JP | 2001108331 | A | | 4/2001 | |
| JP | 2002147895 | A | * | 5/2002 | ............. F25B 39/04 |
| JP | 2003014336 | A | * | 1/2003 | ............. F25B 39/04 |
| JP | 2004239598 | A | * | 8/2004 | |
| JP | 2008267752 | A | * | 11/2008 | ............. F25B 39/04 |
| JP | 2012067939 | A | * | 4/2012 | ............. F25B 39/04 |
| JP | 2012067939 | A | | 4/2012 | |
| JP | 2016027297 | A | | 2/2016 | |
| KR | 100799551 | B1 | * | 1/2008 | ............. F25B 39/04 |
| KR | 100799551 | B1 | | 1/2008 | |

* cited by examiner

CONDENSER

CROSS REFERENCE TO RELATED APPLICATIONS

This application is a U.S. National Phase Application under 35 U.S.C. 371 of International Application No. PCT/JP2015/003247 filed on Jun. 29, 2015 and published in Japanese as WO 2016/002187 A1 on Jan. 7, 2016. This application is based on and claims the benefit of priority from Japanese Patent Application No. 2014-133727 filed on Jun. 30, 2014. The entire disclosures of all of the above applications are incorporated herein by reference.

TECHNICAL FIELD

The present disclosure relates to a condenser that has a modulator tank storing a liquid-phase refrigerant.

BACKGROUND ART

Conventionally, a condenser that condenses a refrigerant includes a modulator tank that separates gas and liquid of the refrigerant flowing out of the condenser and that store the refrigerant. The modulator tank is provided along a side portion of a header tank of the condenser such that the longitudinal direction of the modulator tank coincides with the longitudinal direction (i.e., in the gravity direction) of the header tank. Hereinafter, such a modulator tank is referred to as a vertical modulator tank.

In a market in recent years, a condenser is required to be thin to reduce a mounting space while maintaining a performance of a conventional condenser. Even when the thickness of a core part is reduced to meet the requirement, the capacity of the modulator tank also has to be assured in order to ensure the performance of the condenser.

In the case of a conventional vertical modulator tank, tank diameter cannot be reduced in the viewpoint of ensuring capacity. Therefore, the thickness of the modulator tank in a front-back direction increases with respect to the thickness of a core part and the thickness of a header tank. As a result, a dead space is provided around the core part, making it impossible to reduce the thickness of the entire condenser.

For countervailing the above-described abnormality, a condenser is disclosed in Patent Literature 1. The condenser described in the Patent Literature 1 includes a vertical modulator tank provided on a side edge of the condenser and a horizontal modulator tank provided in a horizontal position on the upper edge of the core part along the core part.

PRIOR ART LITERATURES

Patent Literature

Patent Literature 1: JP 2001-108331 A

SUMMARY OF INVENTION

In recent years, in relation to vehicle design, there has been a tendency to remove an upper-grill opening and to reduce the grill height. According to investigations by the inventors of the present disclosure, outdoor air is not drawn from above the grill into a space in front of the condenser when the upper-grill opening is removed. A volume of outdoor air drawn into the space in front of the condenser decreases when the height of the grill decreases. These drawbacks may result in high-temperature air staying in a higher position in the space in front of the condenser.

In the case where the condenser described in the Patent Literature 1 is mounted to a vehicle, thermal damage such as the horizontal modulator tank being heated by high-temperature air occurs. As a result, the refrigerant may flow reversely into the core part, degrading condenser performance.

In view of the foregoing problems, it is an object of the present disclosure to provide a condenser that can be reduced in thickness while preventing thermal damage to a modulator tank as well as ensuring refrigerant filling characteristics.

A condenser has a core part, a header tank, a first modulator tank, and a second modulator tank. The core part is formed by stacking tubes, in which a refrigerant in a refrigeration cycle flows, and exchanges heat between the refrigerant and an external fluid flowing outside the tubes. The header tank is disposed at an end of the tubes in a longitudinal direction of the tubes, and extends in a direction perpendicular to the longitudinal direction of the tubes to communicate with the tubes. The first modulator tank communicates with an interior of the header tank to allow the refrigerant from the header tank to flow into the first modulator tank. The first modulator tank is provided along a side portion of the header tank extending in the longitudinal direction of the tubes. The second modulator tank communicates with an interior of the first modulator tank and is provided along a lower edge of the core part in a gravity direction. The first modulator tank and the second modulator tank separate the refrigerant flowing into the modulator tanks into gas and liquid, and store an excess refrigerant in the refrigeration cycle. The interior of the header tank is provided with a communicating space that communicates with the interior of the first modulator tank and an interior of the second modulator tank. A liquid-phase refrigerant of the gas and liquid separated from the refrigerant by at least one of the first modulator tank and the second modulator tank flows into the communicating space. The core part has a supercooling portion that supercools the liquid-phase refrigerant by exchanging heat between the liquid-phase refrigerant and the external fluid. The header tank has an introduction passage that guides the liquid-phase refrigerant in the communicating space to the supercooling portion. A first connection part between the communicating space and the introduction passage is disposed on a lower side, in the gravity direction, of a second connection part between the communicating space and the second modulator tank.

According to the present disclosure, in addition to the first modulator tank provided in the header tank, the second modulator tank is provided at the lower end of the core part in the gravity direction. Therefore, even when a structure in which the diameter of the modulator tank is not increased is employed, capacity required for the modulator can be ensured. In addition, the connection part between the communicating space of the header tank and the introduction passage is disposed lower than the connection part between the communicating space and the second modulator tank in the gravity direction, thereby improving gas-liquid separation performance. Furthermore, the second modulator tank is disposed on the lower side of the core part in the gravity direction. Therefore, even when high-temperature air stays in a higher position in space in front of the condenser, heating of the second modulator tank can be prevented. Accordingly, a reduction in thickness can be achieved while thermal damage to the modulator tank is being prevented and refrigerant filling characteristics are being ensured.

DESCRIPTION OF EMBODIMENTS

Embodiments of the present disclosure will be described hereafter referring to drawings. In the embodiments, a part that corresponds to or equivalents to a matter described in a preceding embodiment may be assigned with the same reference number.

First Embodiment

A first embodiment will be described with reference to FIG. 1 to FIG. 8. A condenser according to the first embodiment has the function of storing a liquid-phase refrigerant, in order to hold the refrigerant for a refrigeration cycle.

Figure 1:
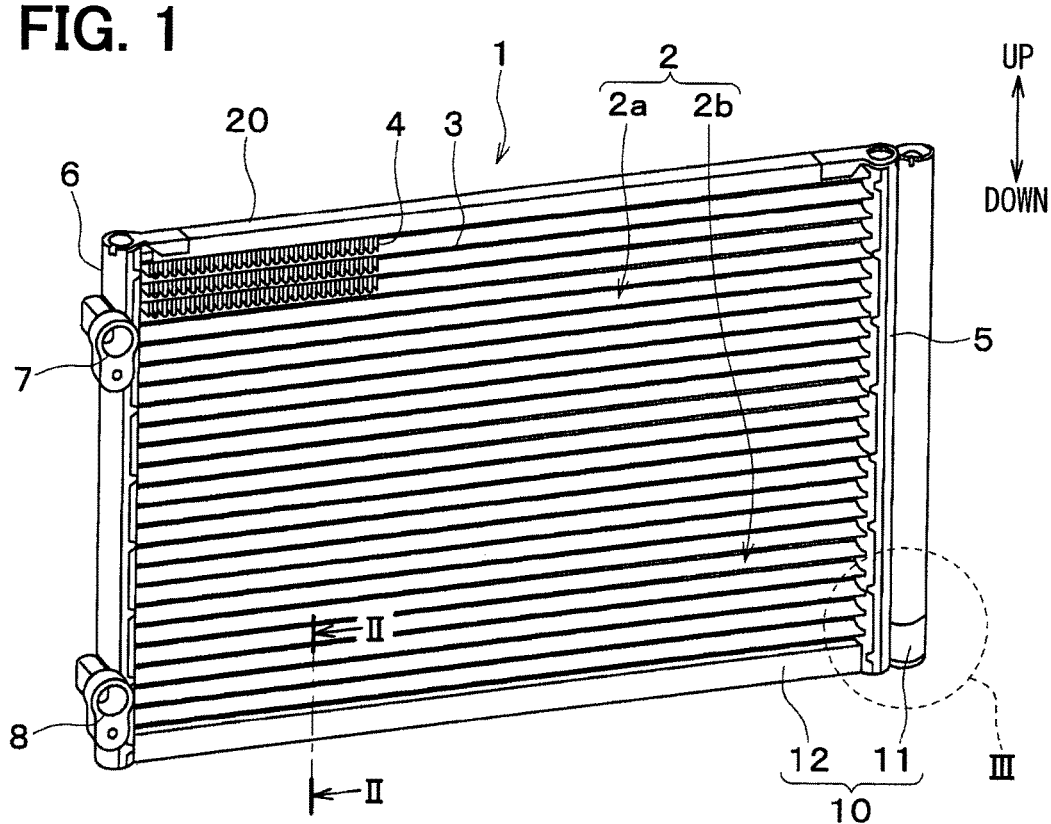
FIG. 1 is a perspective view illustrating a condenser according to a first embodiment.

As shown in FIG. 1, the condenser 1 according to the present invention is a modulator tank integrated type refrigerant condenser that is used in the air conditioner for vehicle and is applied for a refrigeration cycle. The condenser 1 includes a condensing portion 2a, a supercooling portion 2b and a modulator tank 10, and is formed by integrating the portions and the tank.

The condensing portion 2a is a heat-exchange portion that condenses a gas-phase refrigerant by exchanging heat between air (i.e., external fluid) and a refrigerant discharged from a compressor (not shown) in a refrigeration cycle. The modulator tank 10 is a gas-liquid separation part that separates the refrigerant flowing from the condensing portion 2a into a gas-phase refrigerant and a liquid-phase refrigerant, that stores an excess refrigerant in the refrigeration cycle as the liquid-phase refrigerant, and that causes the liquid-phase refrigerant to flow out. The supercooling portion 2b is a heat-exchange portion that increases the degree of supercooling the refrigerant by exchanging heat between air and a liquid-phase refrigerant from the modulator tank 10 and cooling the liquid-phase refrigerant.

The modulator tank 10 according to the present embodiment has a tubular shape having an L-shape in a front view. Specifically, the modulator tank 10 has a first modulator tank 11 disposed at one end of the condenser 1 in a horizontal direction, and a second modulator tank 12 disposed at the lower end of the condenser 1 in the gravity direction. The internal space of the first modulator tank 11 and the internal space of the second modulator 12 communicate with each other.

The condenser 1 has a first header tank 5 and a second header tank 6 which are a pair of cylindrical header tanks arranged with a predetermined distance between the first header tank 5 and the second header tank 6. A core part 2 for heat exchange is arranged between the first header tank 5 and the second header tank 6. The core part 2 includes the condensing portion 2a and the supercooling portion 2b. The condenser 1 is a so-called multi-flow type heat exchanger, in which the refrigerant that has flowed into the first header tank 5 is divided into a plurality of coolant passages and flows toward the second header tank 6.

Figure 2:
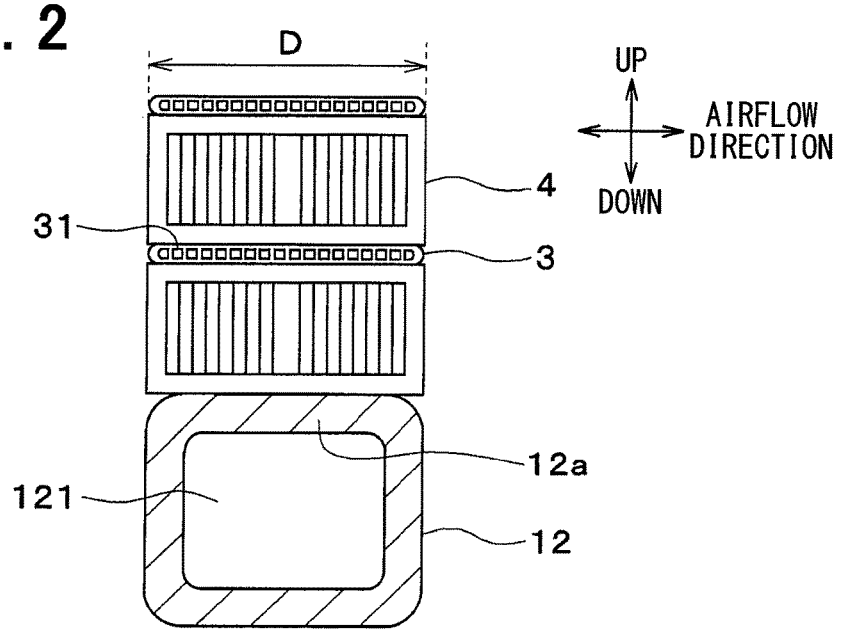
FIG. 2 is a cross-sectional view taken along a line II-II in FIG. 1.
Figure 3:
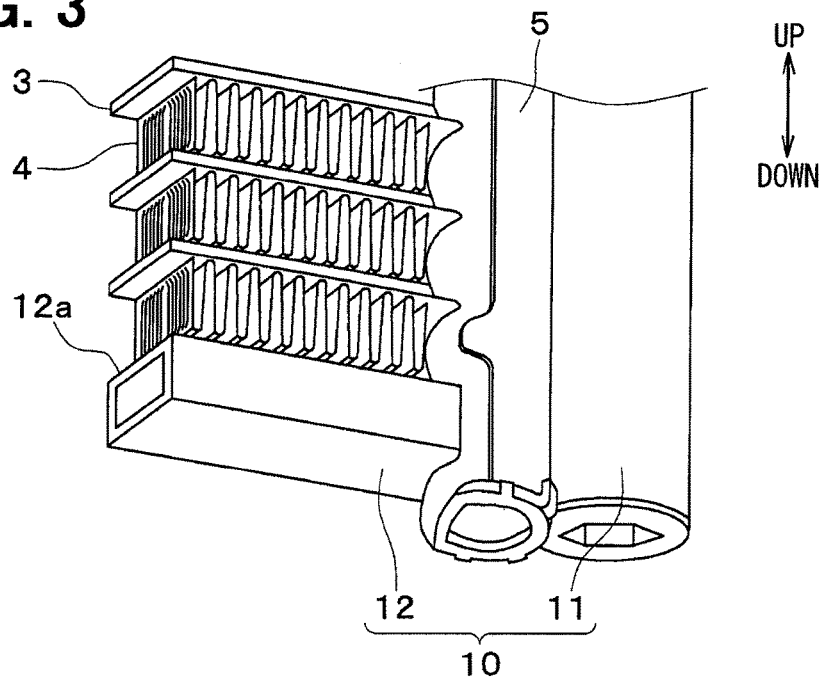
FIG. 3 is an enlarged view illustrating a portion III in FIG. 1.

As shown in FIG. 1 to FIG. 3, the core part 2 includes tubes 3 that have a flattened shape in cross section and are stacked, and the refrigerant flows in the tubes 3 in a horizontal direction between the first header tank 5 and second header tank 6. An outer fin 4 having a wavy (i.e., corrugated) shape are provided between adjacent two of the tubes 3, and more than one of the outer fin 4 is disposed in the core part 2. The tubes 3 and the outer fins 4 are coupled with each other by brazing.

One end of each of the tubes 3 in the longitudinal direction of the tube 3 is arranged to communicate with the inside of the first header tank 5. The other end is arranged to communicate with the inside of the second header tank 6. Each tube 3 that constitutes the core part 2 is formed of a porous tube including a plurality of small passages 31. Such a porous tube can be formed by extrusion. In FIG. 2, D represents the thickness of the core part 2.

Referring back to FIG. 1, a side plate 20 that reinforces the core part 2 is provided at the upper end of the core part 2 in the gravity direction. The side plate 20 extends parallel to the longitudinal direction of the tubes 3. Both ends of the side plate 20 are respectively connected to the first header tank 5 and second header tank 6.

An inlet-side piping joint 7 into which the refrigerant flows is provided on the upper-end side of the second header tank 6 in the gravity direction. An outlet-side piping joint (i.e., a refrigerant outlet) 8 from which the refrigerant is discharges is provided on the lower-end side of the second header tank 6 in the gravity direction. An inlet-side piping joint 7 and outlet-side piping joint 8 are connected to the second header tank 6.

Figure 4:
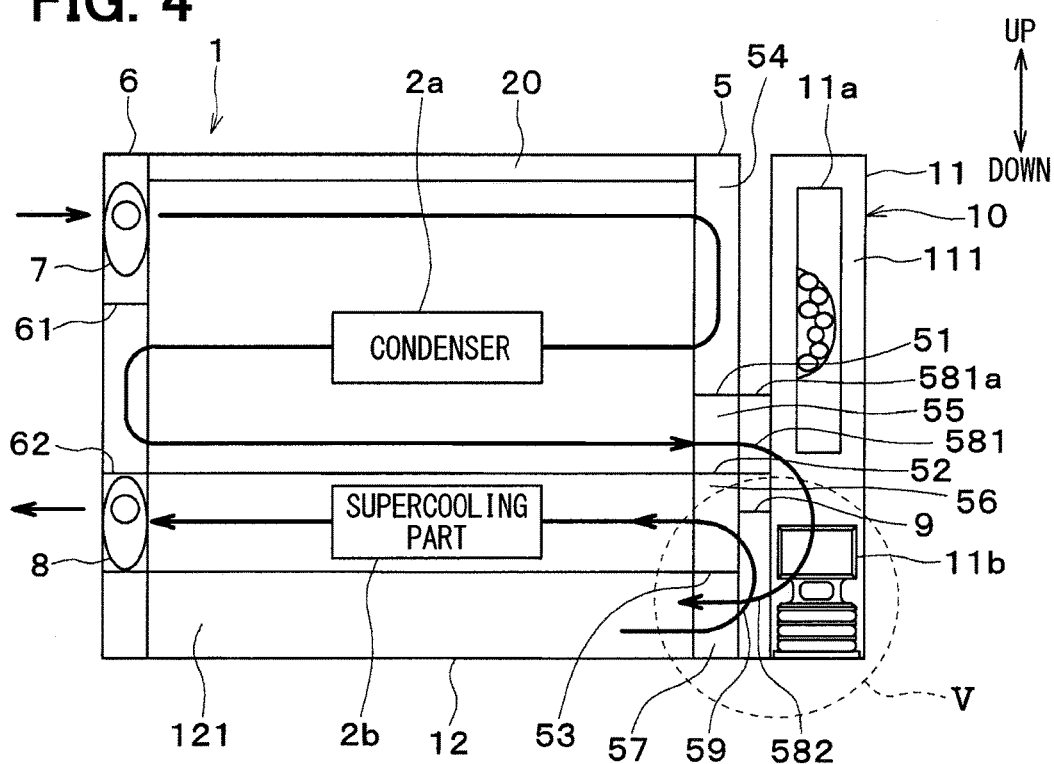
FIG. 4 is a perspective view illustrating the path of a refrigerant flow in the condenser in the first embodiment.

As shown in FIG. 4, a first separator 51, a second separator 52, and a third separator 53 are arranged in the first header tank 5, for partitioning the internal space in the gravity direction. The three separators 51, 52, 53 are arranged to be distanced from each other. By virtue of the three separators 51, 52, 53, the interior of the first header tank 5 is partitioned into four spaces in the gravity direction. The second separator 52 according to the present embodiment corresponds to a first partition member in the present disclosure, and the third separator 53 according to the present embodiment corresponds to a second partition member in the present disclosure.

Two separators 61, 62 are arranged in the second header tank 6, for partitioning the internal space in the gravity direction. The separators 61, 62 are arranged to be distanced from each other. By virtue of the separators 61, 62, the interior of the second header tank 6 is partitioned into three spaces in the gravity direction.

The core part 2 has four channel groups arranged in line in the gravity direction. Among the four channel groups, three channel groups arranged in line in a vertical direction configure a condensing portion 2a, and the lowermost channel part in the gravity direction configures the supercooling portion 2b.

Hereinafter, in the first header tank 5, the internal space located in the uppermost position in the gravity direction is referred to as a first space 54; an internal space located in the second position from the top in the gravity direction, as a second space 55; an internal space located in the third position from the top in the gravity direction, as a third space 56; and an internal space located in the lowermost position in the gravity direction, as a communicating space 57.

The first space 54 and the second space 55 communicate with the condensing portion 2a of the core part 2. The first space 54 and the second space 55 according to the present embodiment correspond to the condensing-side spaces in the present disclosure. The third space 56 communicates with the supercooling portion 2b of the core part 2. The third space 56 according to the present embodiment corresponds to a supercooling-side space in the present disclosure.

The communicating space 57 communicates with both the interior of the first modulator tank 11 and the interior of the second modulator tank 12. The communicating space 57 is configured such that the liquid-phase refrigerant in which gas and liquid are separated by at least one of the first and second modulator tanks 11, 12 flows into the space 57.

Figure 5:
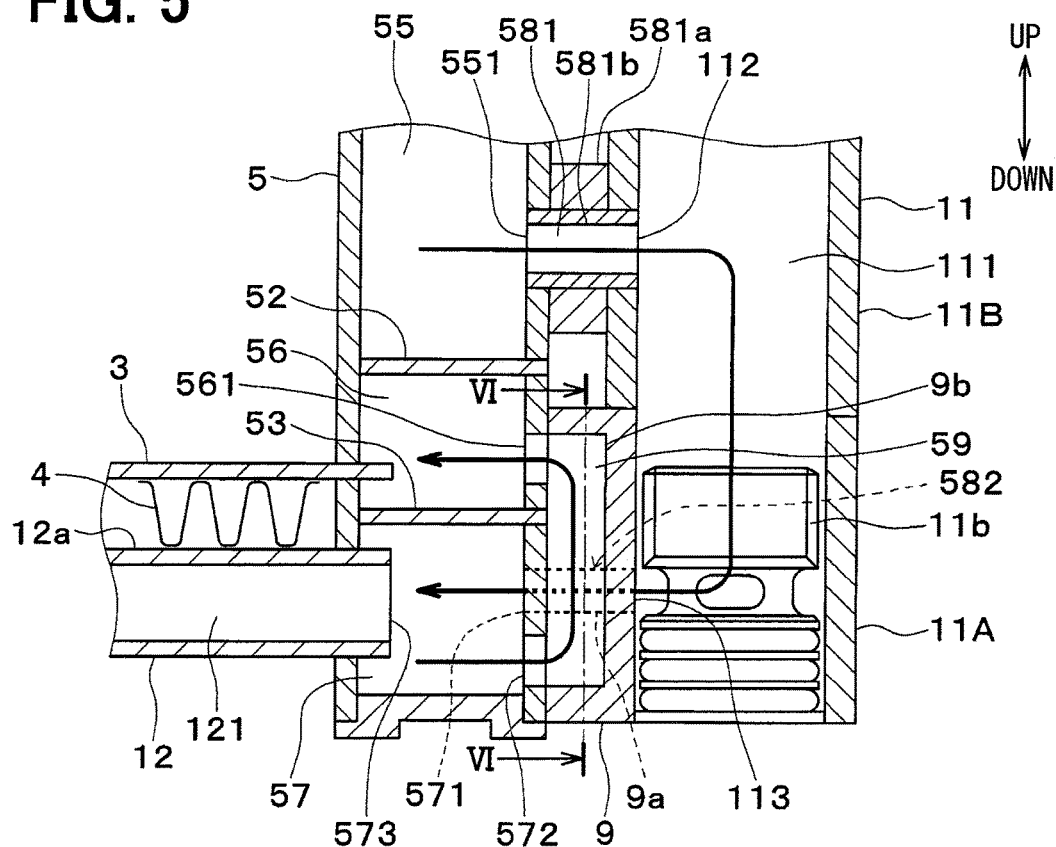
FIG. 5 is an enlarged cross-sectional view illustrating a portion V in FIG. 4.

As shown in FIG. 5, the second space 55 of the first header tank 5 and the internal space 111 of the first modulator tank 11 communicate by means of a first communication passage 581. The communicating space 57 of the first header tank 5 and the internal space 111 of the first modulator tank 11 communicate by means of a second communication passage 582.

On the outside of the first header tank 5, the cylindrical first modulator tank 11 is provided integrally with the first header tank, the first modulator tank separating gas and liquid of the refrigerant to store the liquid-phase refrigerant. The respective internal spaces of the first modulator tank 11 and first header tank 5 communicate with each other by means of the first communication passage 581 and second communication passage 582 described above. The condensing portion 2a, the supercooling portion 2b, and the first modulator tank 11 are molded, for example, by press-working or extruding aluminum or aluminum alloy and are integrally assembled together by brazing (i.e., integrated brazing) such as in-furnace brazing.

The first modulator tank 11 houses a desiccant 11a that absorbs moisture in a refrigeration cycle and a filter 11b that collects foreign matters in a refrigeration cycle. The first modulator tank 11 according to the present embodiment has a support member 11A disposed on the lower side in the gravity direction, and a tank body part 11B jointed integrally with the support member 11A while inserted into the support member 11A.

Additionally, the condenser 1 includes a second modulator tank 12 communicating with the interior of the first modulator tank 11 via the communicating space 57 of the first header tank 5. The second modulator tank 12 is disposed at the lowermost part of the core part 2 in the gravity direction along the lower edge of the core part 2 in the gravity direction.

The second modulator tank 12 is a cylindrical body and has a rectangular shape in cross-section, for example. The second modulator tank 12 has at least a flat part 12a that is a part joining the second modulator tank 12 and an outer fin 4 located in the lowermost part of the core part 2 in the gravity direction.

As shown in FIG. 4, the second modulator tank 12 extends over the entire core part 2 in the lateral direction of the core part 2. One end of the second modulator tank 12 is connected with the lower part of the first header tank 5 in the gravity direction, and the other end of the second modulator tank 12 is connected with the lower part of the second header tank 6 in the gravity direction. With such a configuration, the second modulator tank 12 is supported by other members at both its ends, thus making it possible to maintain desired strength with respect to vibration and so on, and hence exhibiting a reinforcement function for the core part 2 even after the time of actual use has elapsed. The communicating space 57 of the first header tank 5 performs a modulator function together with the internal space of the second modulator tank 12.

The outer fin 4 located in the lowermost part of the condensing portion 2a in the gravity direction and the second modulator tank 12 are molded, for example, by press-working or extruding aluminum or aluminum alloy and are integrally joined together by brazing (i.e., integrated brazing) such as in-furnace brazing. Thus, the second modulator tank 12 supports, from below in the gravity direction, the outer fin 4 located in the lowermost part in the gravity direction. Accordingly, the second modulator tank 12 protects the core part 2 from vibration and thermal deformation, thus reinforcing the core part 2.

The first header tank 5 has an introduction passage 59 that guides the liquid-phase refrigerant in the communicating space 57 to the third space 56. Accordingly, the liquid-phase refrigerant in the communicating space 57 is guided to the supercooling portion 2b via the third space 56 of the first header tank 5.

As shown in FIG. 5, a communication part 581a is interposed between the first modulator tank 11 and the first header tank 5 to configure the first communication passage 581. The communication part 581a has a through-hole 581b. In a part defining the second space 55 for the first header tank 5, a refrigerant inflow port 551 is formed in a wall opposite to the first modulator tank 11. In the first modulator tank 11, a refrigerant outflow port 112 is formed at a position opposite to the refrigerant inflow port 551 of the first header tank 5.

The communication part 581a is disposed between the first header tank 5 and the first modulator tank 11, thereby connecting the refrigerant inflow port 551, the through-hole 581b, and the refrigerant outflow port 112. The refrigerant inflow port 551, the through-hole 581b, and the refrigerant outflow port 112 configure the first communication passage 581.

Figure 6:
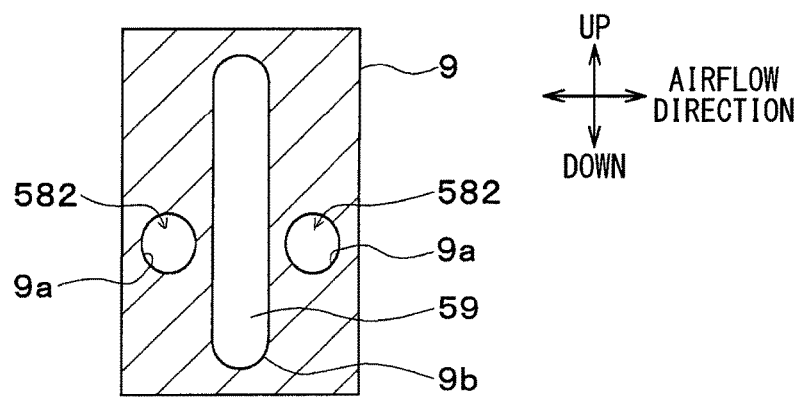
FIG. 6 is a cross-sectional view taken along a line VI-VI in FIG. 5.

As shown in FIG. 5 and FIG. 6, a connection member 9 is interposed between the first modulator tank 11 and the first header tank 5 to configure the second communication passage 582. The connection member 9 has two through-holes 9a. In a part defining the communicating space 57 for the first header tank 5, two refrigerant inflow ports 571 are formed in a wall opposite to the first modulator tank 11. In the first modulator tank 11, two refrigerant outflow ports 113 are formed in a position opposite to the two refrigerant inflow ports 571 of the first header tank 5.

The connection member 9 is disposed between the first header tank 5 and the first modulator tank 11, thereby connecting the refrigerant outflow port 113, the through-hole 9a, and the refrigerant inflow port 571. The refrigerant outflow port 113, the through-hole 9a, and the refrigerant inflow port 571 configure the second communication passage 582.

The connection member 9 has a groove 9b extending in the gravity direction. In the present embodiment, the groove 9b is formed in such a manner that substantially the middle part of the connection member 9 in the airflow direction is recessed toward the first modulator tank 11. The groove 9b is disposed between the two through-holes 9a in the airflow direction.

In a part defining the communicating space 57 for the first header tank 5, a refrigerant outflow port 572 is formed in a wall opposite to the first modulator tank 11. The refrigerant outflow port 572 is disposed lower than the refrigerant inflow port 571 in the gravity direction. In a part defining the third space 56 for the first header tank 5, a refrigerant inflow port 561 is formed in the wall opposite to the first modulator tank 11.

The connection member 9 is disposed between the first header tank 5 and first modulator tank 11, thereby connecting the refrigerant outflow port 572, the groove 9b, and the refrigerant inflow port 561. The refrigerant outflow port 572, the groove 9b, and the refrigerant inflow port 561 configure the introduction passage 59.

In the present embodiment, the connection member 9 is formed separately from the first header tank 5 and first modulator tank 11. The connection member 9 according to the present embodiment corresponds to a second-introduction-passage formation member in the present disclosure.

The communication part 581a and the connection member 9 are disposed between the first header tank 5 and the first modulator tank 11. Accordingly, spaces are defined between the first header tank 5 and the first modulator tank 11, each space being equal in thickness to the communication part 581a and connection member 9. Therefore, the communication part 581a and the connection member 9 form air layers for insulation between the first header tank 5 and the first modulator tank 11, thereby restricting heat transfer between the first header tank 5 and the first modulator tank 11.

As shown in FIG. 5, the communicating space 57 of the first header tank 5 and the introduction passage 59 are connected by the refrigerant outflow port 572. That is, the refrigerant outflow port 572 is a connection part connecting the communicating space 57 of the first header tank 5 and the introduction passage 59. The refrigerant outflow port (i.e., a first connection part) 572 is disposed lower than a connection part (i.e., a second connection part) 573 connecting the communicating space 57 and the second modulator tank 12 in the gravity direction. The connection part 573 connecting with the second modulator tank 12 is, in other words, an open end of a cylindrical body configuring the second modulator tank 12. More specifically, in the gravity direction in the communicating space 57, the lower end of the refrigerant outflow port 572 is lower than the lower end of the connection part 573 connecting with the second modulator tank 12.

In the present embodiment, the communicating space 57 and the first modulator tank 11 are connected by the refrigerant inflow port 571. That is, the refrigerant inflow port 571 is a connection part connecting the communicating space 57 and the first modulator tank 11. The refrigerant inflow port (i.e., third connection part) 571 is disposed at the same level in the gravity direction as the connection part (i.e., second connection part) 573 connecting the communicating space 57 and the second modulator tank 12.

The first modulator tank 11, the first header tank 5, the communication part 581a, the connection member 9, and the second modulator tank 12 are molded from aluminum or aluminum alloy and are integrally joined by brazing (i.e., integrated brazing) such as in-furnace brazing.

Referring back to FIG. 4, the refrigerant discharged from the compressor in a refrigeration cycle flows from the inlet-side piping joint 7 into the uppermost space of the second header tank 6, then flows through the channel group in the uppermost part of the condensing portion 2a, and flows into the first space 54 of the first header tank 5. The refrigerant that has flowed into the first space 54 flows in the channel group in the middle of the condensing portion 2a, the internal space in the middle of the second header tank 6, and the channel group in the lowermost part of the condensing portion 2a in that order, and then flows into the second space 55 of the first header tank 5.

The refrigerant that has flowed into the second space 55 passes through the first communication passage 581, then flows into the internal space 111 of the first modulator tank 11, and flows from the second communication passage 582 into the communicating space 57 of the first header tank 5. Some refrigerant in the communicating space 57 flows into an internal space 121 of the second modulator tank 12. The remaining refrigerant in the communicating space 57 passes through the connection member 9, and flows to outside via the third space 56 of the first header tank 5, the supercooling portion 2b, the lowermost space of the second header tank 6, and the outlet-side piping joint 8 in this order.

As just described, the refrigerant that has flowed into the internal space 111 of the first modulator tank 11 can also flow into the internal space 121 of the second modulator tank 12 via the communicating space 57 of the first header tank 5. Thus, since the capacity of the modulator tank 10 can be increased, the ability of the condenser 1 to fill with the refrigerant can be improved.

Figure 7:
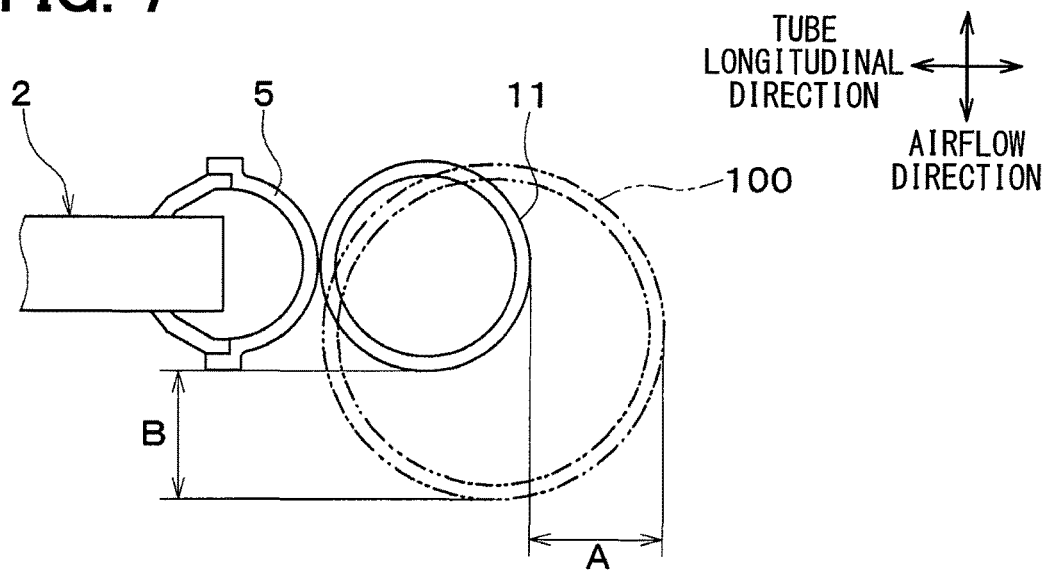
FIG. 7 is a schematic view illustrating a difference in size of a modulator tank between the condenser in the first embodiment and a condenser in a reference example.

As shown in FIG. 7, in the case of a condenser according to a reference example that has a vertical modulator tank 100 as a modulator (hereinafter, simply referred to as a reference-example condenser), the modulator tank 100 has to ensure a predetermined volume of refrigerant held in a refrigeration cycle. For this reason, in the reference-example condenser, the tank diameter increases in relation to a first header tank 5 in order to ensure required tank-capacity. Therefore, when one end of the first header tank 5 and one end of the modulator tank 100 are joined in the airflow direction, the modulator tank 100 protrudes at the other end by approximately the dimension B indicated in FIG. 7. In the reference-example condenser, the length of a tube in the longitudinal direction increases by approximately the dimension A indicated in FIG. 7.

However, in the condenser 1 according to the present embodiment, the tank capacity of the modulator can be ensured by the first modulator tank 11 as well as the second modulator tank 12. Therefore, it is possible to reduce the tank diameter of the first modulator tank 11. Accordingly, the tank diameter of the first modulator tank 11 can be close to the thickness of the core part 2 and the tank diameter of the first header tank 5. Thus, in the configuration according to the present embodiment, the size of the condenser 1 can be reduced both in the thickness direction of the core part (i.e., in the airflow direction) and in the width direction of the core part (i.e., the tube longitudinal direction).

Figure 8:
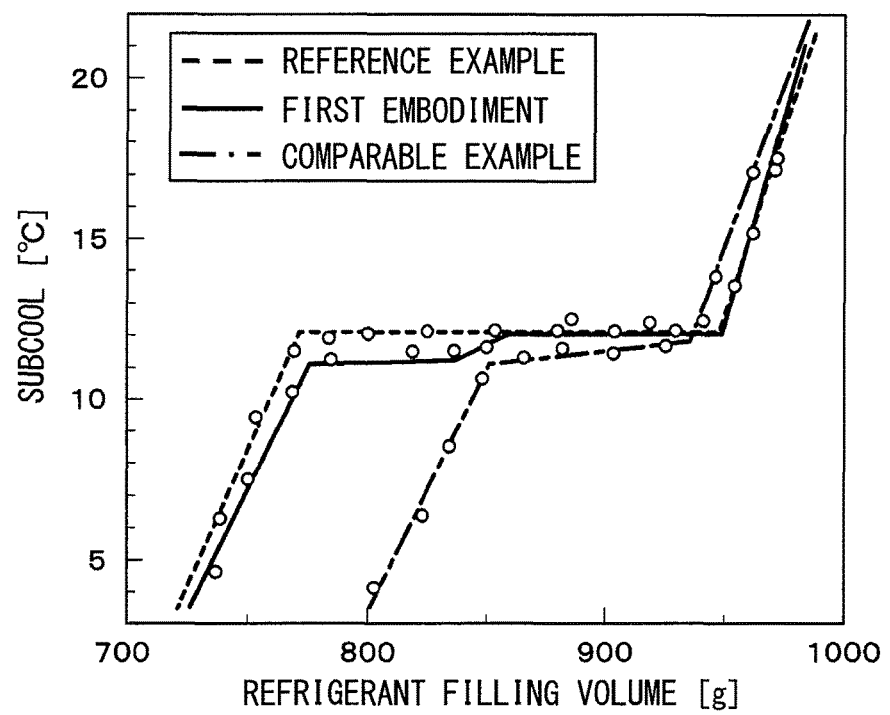
FIG. 8 is a graph showing the results of the experiment of refrigerant filling characteristics conducted in the condenser in the first embodiment, the condenser in the reference example, and a condenser in a comparable example.

Here, a condenser having, as a modulator, only a horizontal modulator tank disposed on the lower side of a core part in the gravity direction will be referred to as a comparable example condenser. The inventors in the present disclosure experimentally did operate the reference-example condenser, the comparable example condenser, and the condenser 1 according to the present embodiment in a refrigeration cycle under specified conditions, and verified the variation of sub-cooling degree with respect to a variation of a refrigerant filling volume that is a volume of refrigerant filling the condenser for the cycle. FIG. 8 shows the results.

The reference-example condenser, the comparable example condenser, and the condenser according to the present embodiment used in the experiment have respective core parts identical in size. The capacity of the vertical modulator tank in the reference-example condenser, the capacity of the lateral modulator tank in the comparable example condenser, and the total capacities of the first and second modulator tanks 11, 12 in the condenser 1 according to the present embodiment are set equal.

As shown in the solid and broken lines in FIG. 8, both the reference example condenser and the condenser according to the present embodiment have, in the range from 770 g to 950 g of the refrigerant filling volume, a stable zone in which subcooling is stable at about 12° C., when the volume of refrigerant filling the condenser for a cycle is increased. As may be seen from the above, even though the condenser 1 according to the present embodiment is reduced in tank diameter by virtue of a structure in which the modulator tank 10 is divided into two, the condenser 1 exhibits refrigerant filling characteristics comparable to the reference-example condenser, thus making it possible to ensure the same performance as the reference-example condenser.

As shown in the chain line in FIG. 8, the comparable example condenser has, in the range from 850 g to 940 g of the refrigerant filling volume, a stable zone in which sub-cooling is stable at about 11 to 12° C., which is narrower than the stable zone of the condenser 1 according to the present embodiment. Thus, the condenser 1 according to the present embodiment is able to achieve high filling characteristics, compared to the comparable example condenser.

As described above, according to the configuration in the present embodiment, the condenser 1 has the first modulator tank 11 provided on the side of and along the first header tank 5 and the second modulator tank 12 provided at the lower end of the core part 2 in the gravity direction. Accordingly, the modulator tanks 11, 12 share the required capacity. Therefore, even when a structure designed to reduce the diameter of each of the modulator tanks 11, 12 is employed, capacity required for a modulator can be ensured. Since the tank diameter can be reduced in this way, the sizes of the condenser 1 in the thickness direction and in the width direction can be reduced to minimize a dead space around the condenser 1. Accordingly, mountability of the condenser can be improved, which is useful in the condenser 1 mounted especially in an engine space or the like of a vehicle.

In the present embodiment, the connection part (i.e., the refrigerant outflow port 572) between the communicating space 57 of the first header tank 5 and the introduction passage 59 is disposed lower than the connection part 573 between the communicating space 57 and the second modulator tank 12 in the gravity direction. With this configuration, the gas-phase refrigerant present in a higher position in the communicating space 57 in the gravity direction can be restricted from flowing into the introduction passage 59. That is, the liquid-phase refrigerant present in a lower position in the communicating space 57 in the gravity direction can be guided into the supercooling portion 2b by being caused to securely flow into the introduction passage 59. Accordingly, gas-liquid separation performance can be improved.

Furthermore, in the present embodiment, the second modulator tank 12 is disposed on the lower side of the core part 2 in the gravity direction. Therefore, even when high-temperature air stays in a higher position in space in front of the condenser 1, heating of the second modulator tank 12 is restricted.

As described above, according to the configuration of the present embodiment, heat damage to the modulator tanks 11, 12 can be restricted and thickness can be reduced while refrigerant filling characteristics can be ensured.

In the present embodiment, the second modulator tank 12 is joined to the outer fin 4. With this configuration, the second modulator tank 12 functions as a reinforcement member. Therefore, the second modulator tank 12 can function as a conventional side plate or the like. Accordingly, the rigidity of the condenser 1 can be maintained and improved and the need for a side plate can be eliminated. Therefore, an increase in the number of components can be avoided.

Second Embodiment

Figure 9:
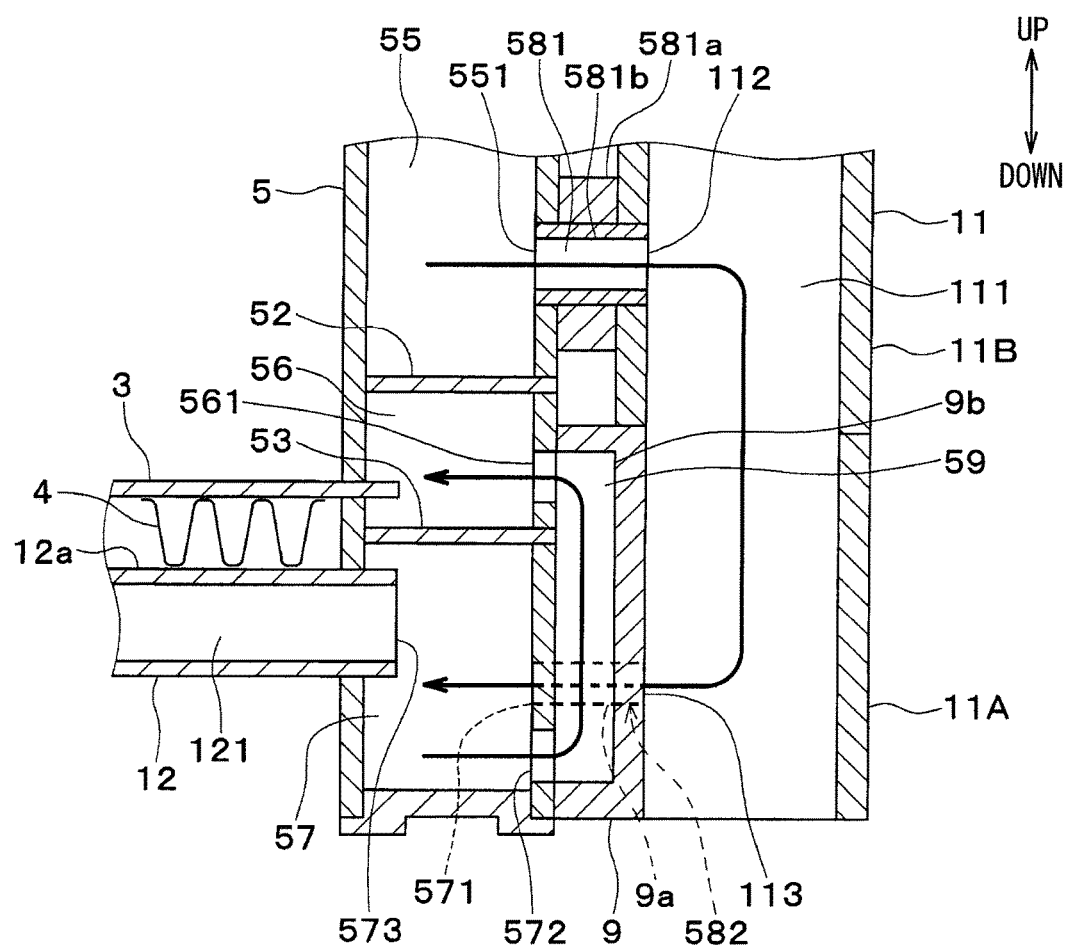
FIG. 9 is a partial perspective view illustrating a condenser according to a second embodiment.

Next, the second embodiment in the present disclosure will be described with reference to FIG. 9. The second embodiment differs from the first embodiment in the position in which a refrigerant inflow port 571 for a second communication passage 582 is disposed. In FIG. 9, a filter 11*b* is omitted.

As shown in FIG. 9, in the present embodiment, the refrigerant inflow port 571 is a connection part between a communicating space 57 and a first modulator tank 11, that is, a connection part between the communicating space 57 and a second communication passage 582. The refrigerant inflow port (i.e., third connection part) 571 is disposed lower in the gravity direction than a connection part (i.e., second connection part) 573 between the communicating space 57 and a second modulator tank 12.

According to the present embodiment, the refrigerant present in the internal space 121 of the second modulator tank 12 behaves in the same manner as the refrigerant present higher than the first communication passage 581 in the internal space 111 of the first modulator tank 11 in the gravity direction. Accordingly, it is possible to further improve gas-liquid separation performance.

Third Embodiment

Figure 10:
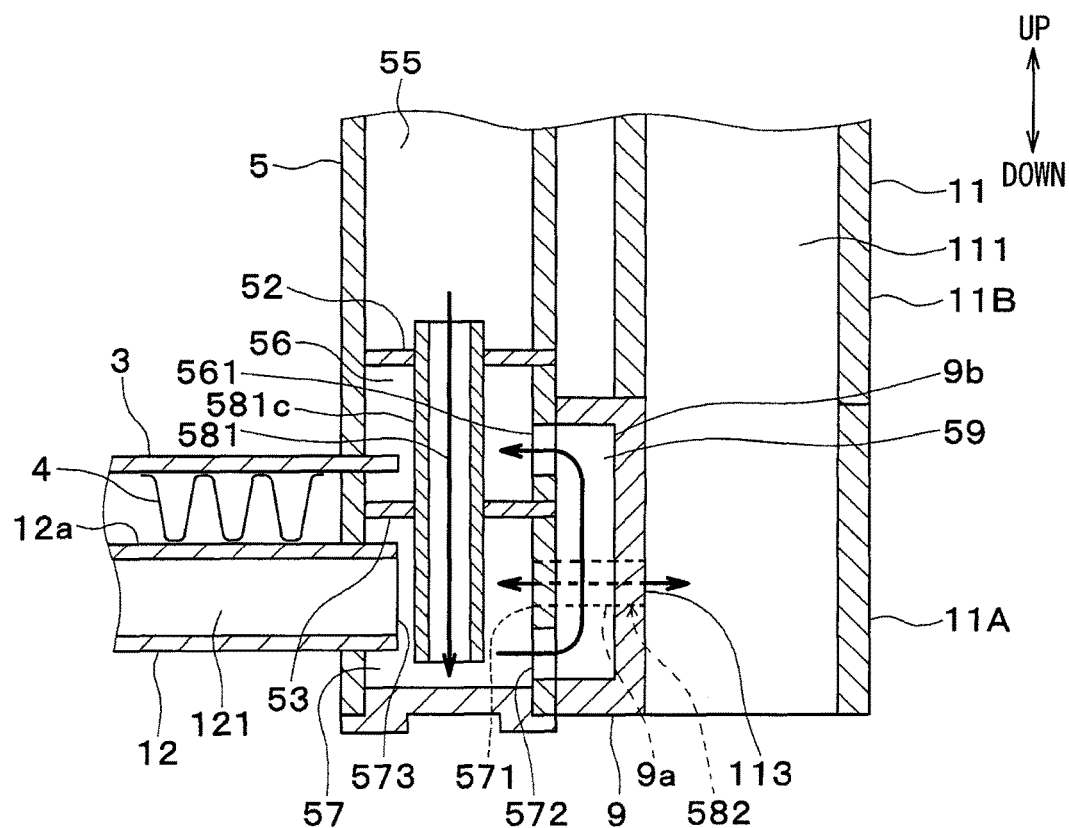
FIG. 10 is a partial perspective view illustrating a condenser according to a third embodiment.

Next, the third embodiment in the present disclosure will be described with reference to FIG. 10. The third embodiment differs from the first embodiment in the configuration of a first communication passage 581. In FIG. 10, a filter 11*b* is omitted.

As shown in FIG. 10, a pipe 581*c* as a first tubular member, through which the refrigerant passes, is provided in the first header tank 5. The pipe 581*c* is disposed to pass through both a second separator 52 and a third separator 53. Accordingly, a second space 55 of the first header tank 5 and a communicating space 57 communicate via the pipe 581*c*. That is, the refrigerant from the second space 55 flows into the communicating space 57 via the pipe 581*c*. In the present embodiment, the pipe 581*c* is located in the communicating space 57 and between a connection part (i.e., refrigerant inflow port 571) connecting with a second communication passage 582 and a connection part 573 connecting with a second modulator tank 12.

The communicating space 57 communicates with the internal space 111 of the first modulator tank 11 via the second communication passage 582. Accordingly, the refrigerant in the second space 55 of the first header tank 5 flows into the internal space 111 of the first modulator tank 11 after passing through the pipe 581*c*, the communicating space 57, and the second communication passage 582 in this order. Therefore, in the present embodiment, the pipe 581*c*, the communicating space 57, and the second communication passage 582 configure a first communication passage 581.

According to the present embodiment, the communication part 581*a* configuring the first communication passage 581 can be eliminated, thus allowing a reduction in the number of components. Furthermore, in the present embodiment, the pipe 581*c* is disposed in the communicating space 57 of the first header tank 5 and between the connection part (i.e., refrigerant inflow port 571) connecting with the second communication passage 582 and the connection part 573 connecting with the second modulator tank 12. Thus, the internal space 121 of the second modulator tank 12 is prevented from being subject to dynamic pressure of refrigerant flow (i.e., main flow) from the second communication passage 582.

Fourth Embodiment

Figure 11:
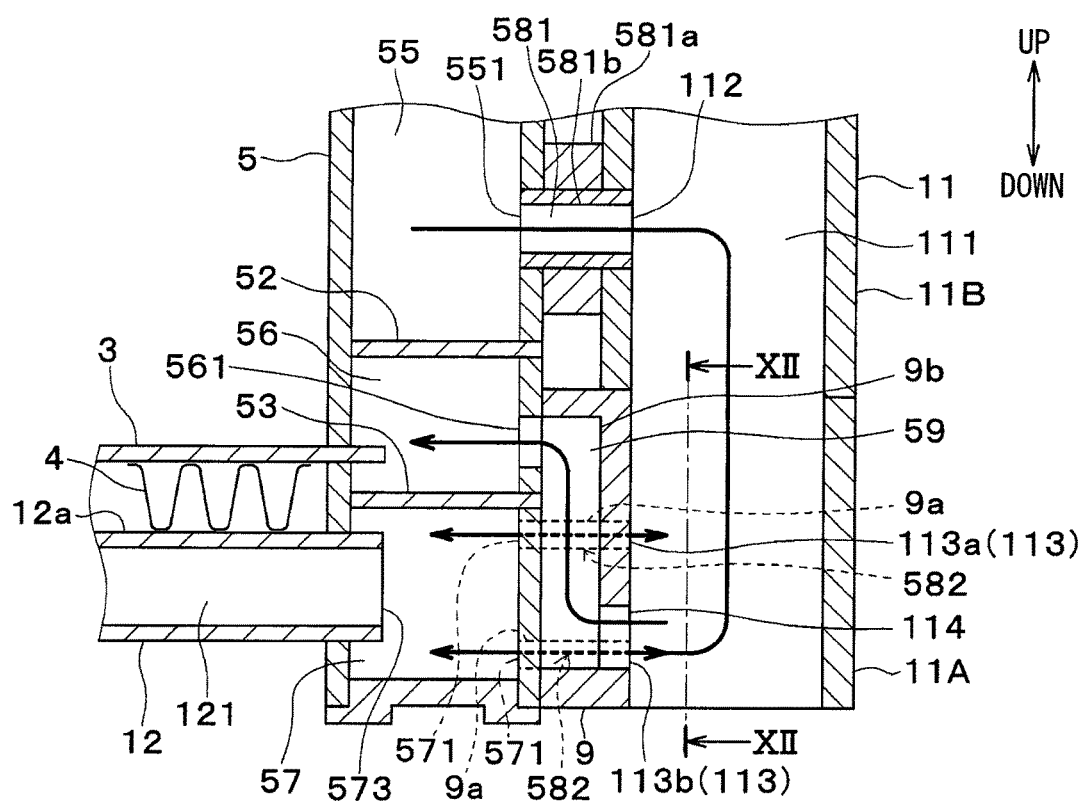
FIG. 11 is a partial enlarged cross-sectional view illustrating a condenser according to a fourth embodiment.
Figure 12:
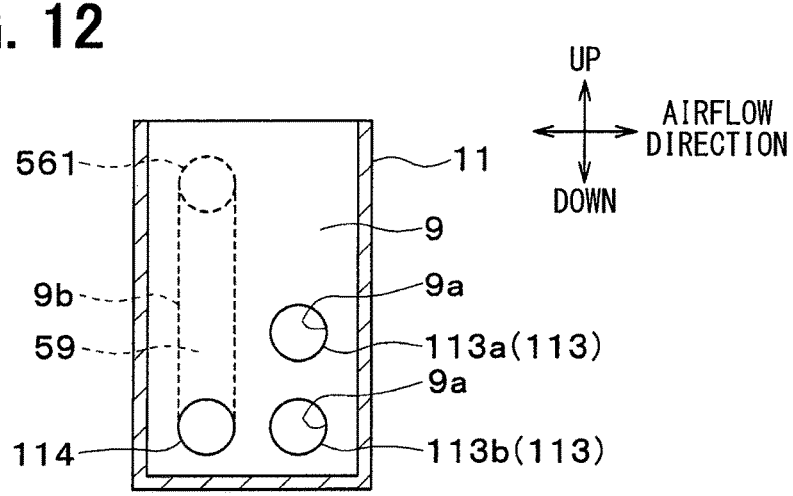
FIG. 12 is a cross-sectional view taken along a line XII-XII in FIG. 11.

Next, the fourth embodiment in the present disclosure will be described with reference to FIG. 11 and FIG. 12. The fourth embodiment differs from the first embodiment in the configurations of a second communication passage 582 and an introduction passage 59. In FIG. 11 and FIG. 12, a filter 11*b* is omitted.

As shown in FIG. 11 and FIG. 12, in the present embodiment, two through-holes 9*a* formed in a connection member 9 are disposed in line in the gravity direction. By virtue of this, in the first modulator tank 11, two refrigerant outflow ports 113 are formed in line in the gravity direction. Of the two refrigerant outflow ports 113, the upper one in the gravity direction is referred to as an upper refrigerant outflow port 113*a*, and the lower one in the gravity direction is referred to as a lower refrigerant outflow port 113*b*.

In the lower end of the first modulator tank 11 in the gravity direction, a refrigerant outflow port 114 is formed in a wall opposite to a first header tank 5. The refrigerant outflow port 114 is connected with a groove 9*b*. The internal space 111 of the first modulator tank 11 communicates with a third space 56 of the first header tank 5 via the groove 9*b*.

The liquid-phase refrigerant in a communicating space 57 is guided into the third space 56 after passing through a second communication passage 582, the internal space 111 of the first modulator tank 11, the refrigerant outflow port 114, the groove 9*b*, and a refrigerant inflow port 561 in this order. Therefore, in the present embodiment, the second communication passage 582, the internal space 111 of the first modulator tank 11, the refrigerant outflow port 114, the groove 9*b*, and the refrigerant inflow port 561 configure an introduction passage 59.

As shown in FIG. 12, in the present embodiment, the lower end of the refrigerant outflow port 114 in the gravity direction is located at the same level in the gravity direction as the lower end of the lower refrigerant outflow port 113*b* in the gravity direction. The lower end of the refrigerant outflow port 114 in the gravity direction may be disposed lower than the lower end of the lower refrigerant outflow port 113*b* in the gravity direction.

As described above, in the present embodiment, the refrigerant outflow port 114 for causing the refrigerant to flow into the introduction passage 59 is located in the first modulator tank 11. In addition, the lower end of the refrigerant outflow port 114 in the gravity direction is located at the same level, in the gravity direction, as the lower end of the lower refrigerant outflow port 113*b*, or at a lower side of the lower refrigerant outflow port 113*b*. Accordingly, the internal space 121 of the second modulator tank 12 is prevented from being subject to dynamic pressure of refrigerant flow (i.e., main flow) from the second communication passage 582.

Fifth Embodiment

Figure 13:
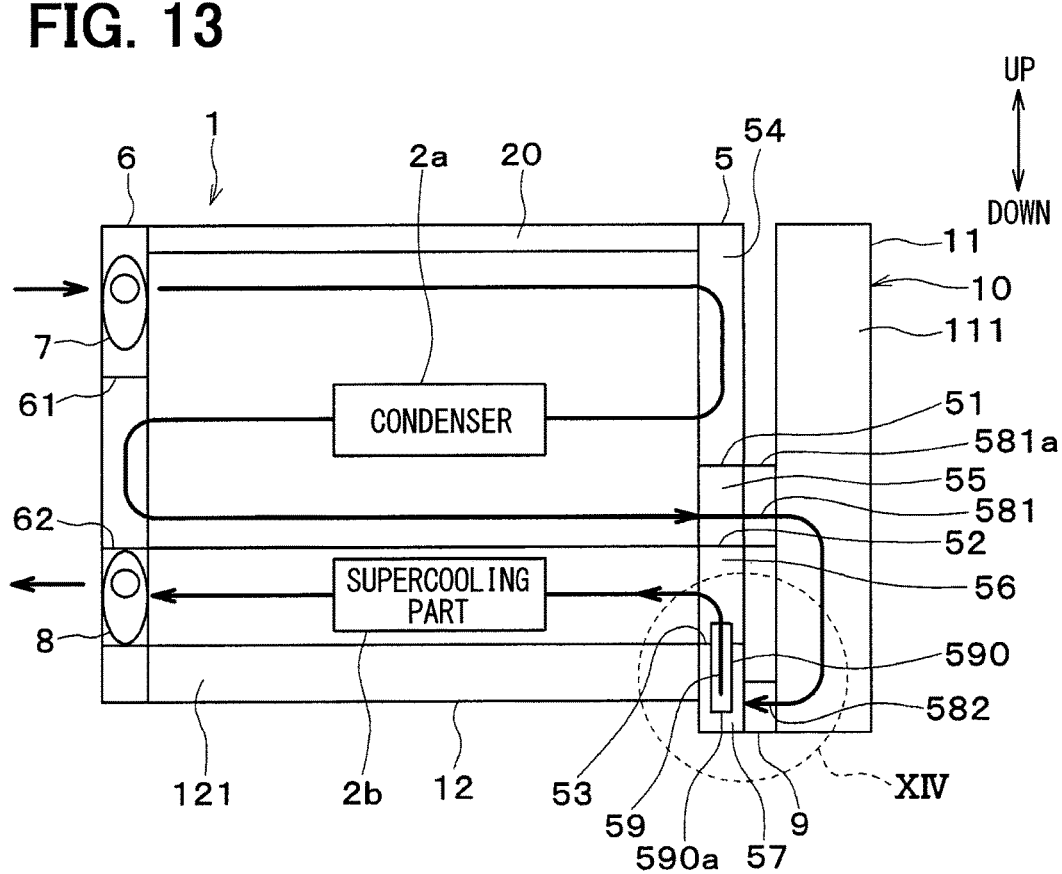
FIG. 13 is a perspective view illustrating the path of a refrigerant flow in a condenser in a fifth embodiment.

Next, the fifth embodiment in the present disclosure will be described with reference to FIG. 13 and FIG. 14. The fifth embodiment differs from the first embodiment in the configuration of an introduction passage 59. In FIG. 13, a desiccant 11*a* and a filter 11*b* are omitted.

Figure 14:
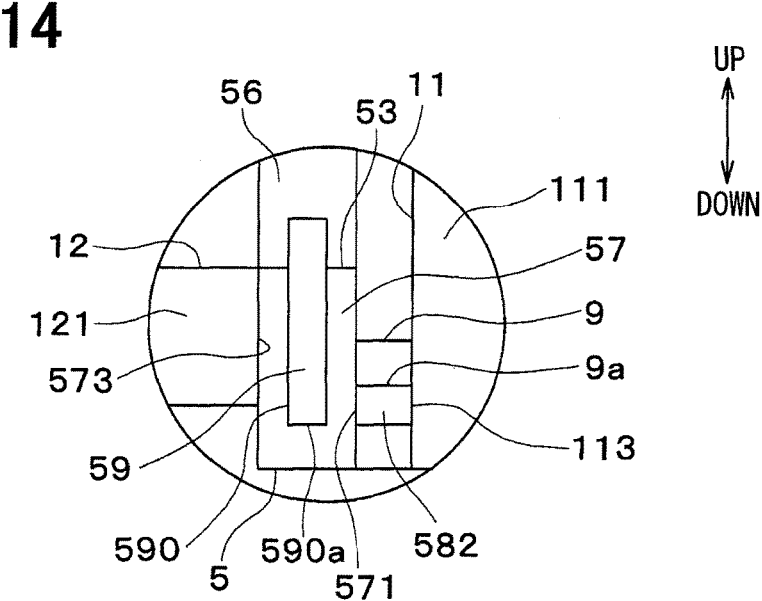
FIG. 14 is an enlarged view illustrating a portion XIV in FIG. 13.

As shown in FIG. 13 and FIG. 14, a pipe 590 as a second tubular member, through which the refrigerant passes, is provided in the first header tank 5. The pipe 590 is disposed to pass through a third separator 53. Therefore, a third space 56 of the first header tank 5 and a communicating space 57 communicate via the pipe 590. That is, the refrigerant from the communicating space 57 flows into the third space 56 via the pipe 590. Accordingly, in the present embodiment, the pipe 590 configures the introduction passage 59.

The communicating space 57 of the first header tank 5 and the introduction passage 59 are connected by the refrigerant inflow port 590a of the pipe 590. That is, the refrigerant inflow port 590a of the pipe 590 is a connection part connecting the communicating space 57 of the first header tank 5 and the introduction passage 59. The refrigerant inflow port 590a of the pipe 590 is disposed lower than the connection part 573 between the communicating space 57 and a second modulator tank 12 in the gravity direction.

The other configurations are identical to those in the first embodiment. Therefore, the condenser 1 according to the present embodiment can obtain the same effects as the condenser 1 according to the first embodiment.

Sixth Embodiment

Figure 15:
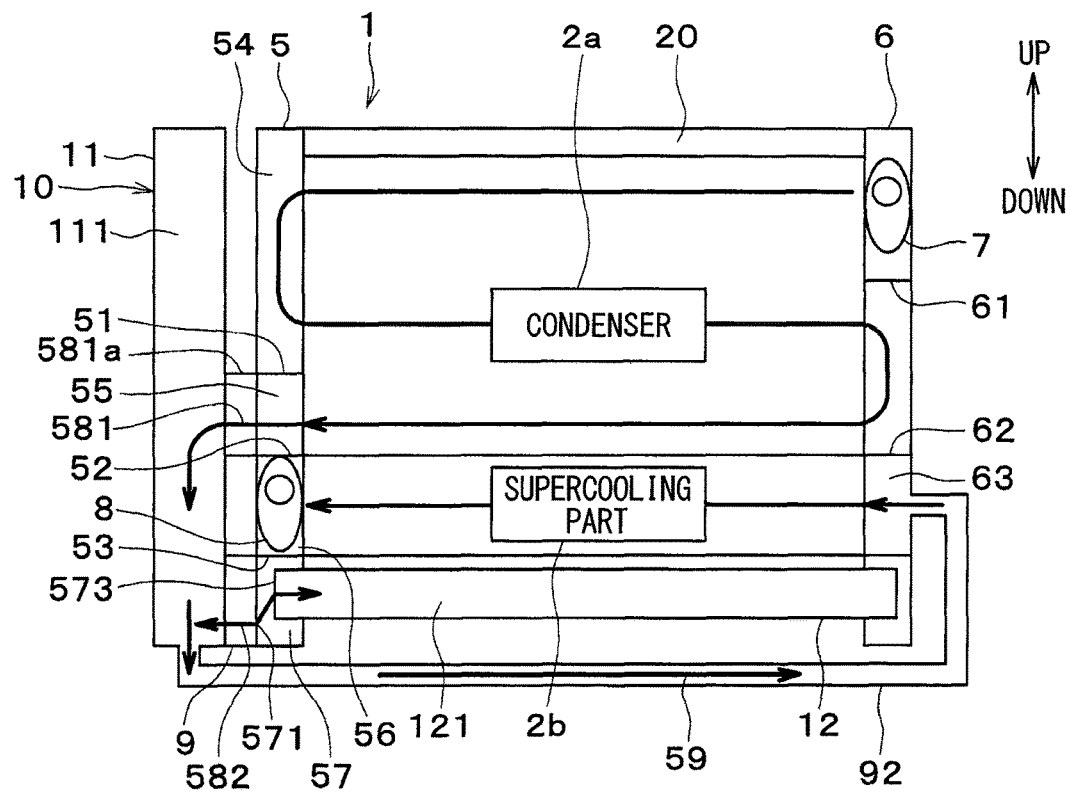
FIG. 15 is a perspective view illustrating the path of a refrigerant flow in a condenser in a sixth embodiment.

Next, the sixth embodiment in the present disclosure will be described with reference to FIG. 15. The sixth embodiment differs from the first embodiment in configuration or the like of an introduction passage 59. In FIG. 15, a desiccant 11a and a filter 11b are omitted.

As shown in FIG. 15, an outlet-side piping joint 8 from which the refrigerant is discharged is provided on the lower side of a first header tank 5 in the gravity direction, that is, in a part corresponding to a third space 56. The outlet-side piping joint 8 is joined to the first header tank 5.

Here, the lowermost internal space of a second header tank 6 in the gravity direction is referred to as a lower-end space 63. The condenser 1 is provided with a communication channel 92 in which the refrigerant circulates and which connects the lower end of a first modulator tank 11 in the gravity direction and the lower part of the second header tank 6 in the gravity direction. The refrigerant inlet side of the communication channel 92 is connected with the lower end of the first modulator tank 11 in the gravity direction.

The communication channel 92 connects the internal space 111 of the first modulator tank 11 and the lower-end space 63 of the second header tank 6. That is, the refrigerant in the internal space 111 of the first modulator tank 11 flows into the lower-end space 63 via the communication channel 92. The refrigerant flowing into the lower-end space 63 flows to outside via a supercooling portion 2b, the third space 56 of the first header tank 5, and the outlet-side piping joint 8.

The internal space 111 of the first modulator tank 11 communicates with a communicating space 57 of the first header tank 5 via a second communication passage 582. Accordingly, the liquid-phase refrigerant in the communicating space 57 flows in the second communication passage 582, the internal space 111 of the first modulator tank 11, and the communication channel 92 in this order, and is guided into the lower-end space 63 of the second header tank 6. Therefore, in the present embodiment, the second communication passage 582, the internal space 111 of the first modulator tank 11, and the communication channel 92 configure the introduction passage 59.

A connection part (i.e., a refrigerant inflow port 571 of the second communication passage 582) between the communicating space 57 of the first header tank 5 and the introduction passage 59 is disposed lower than a connection part 573 between the communicating space 57 and a second modulator tank 12 in the gravity direction.

In the condenser 1 in the first embodiment, the second modulator tank 12 is joined to an outer fin 4 and, therefore, the second modulator tank 12 is in thermal contact with a core part 2. Due to this, the innermost part of the internal space 121 of the second modulator tank 12 on the second header tank 6 side is subject to cold from the refrigerant sufficiently cooled on the downstream side of refrigerant flow in a supercooling portion 2b, that is, sufficiently cooled in the supercooling portion 2b. As a result, the supercooled liquid-phase refrigerant is liable to stay in this innermost part of the second modulator tank 12.

Compared to this, in the present embodiment, the first header tank 5 adjacently communicating with the first modulator tank 11 is provided with the outlet-side piping joint 8 for refrigerant. The refrigerant inlet side of the communication channel 92 that causes the refrigerant from the communicating space 57 to flow into the lower-end space 63 of the second header tank 6 is connected with the lower end of the first modulator tank 11 in the gravity direction. With this configuration, the internal space 121 of the second modulator tank 12 on the side of the connection part 573 connecting with the communicating space 57 receives cold from the refrigerant on downstream of refrigerant flow in the supercooling portion 2b.

Therefore, the innermost part of the internal space 121 of the second modulator tank 12 on the second header tank 6 side is prevented from being subject to cold from the refrigerant sufficiently cooled on the downstream side of refrigerant flow in the supercooling portion 2b. Accordingly, the supercooled liquid-phase refrigerant is prevented from staying in the innermost part of the second modulator tank 12.

Seventh Embodiment

Figure 16:
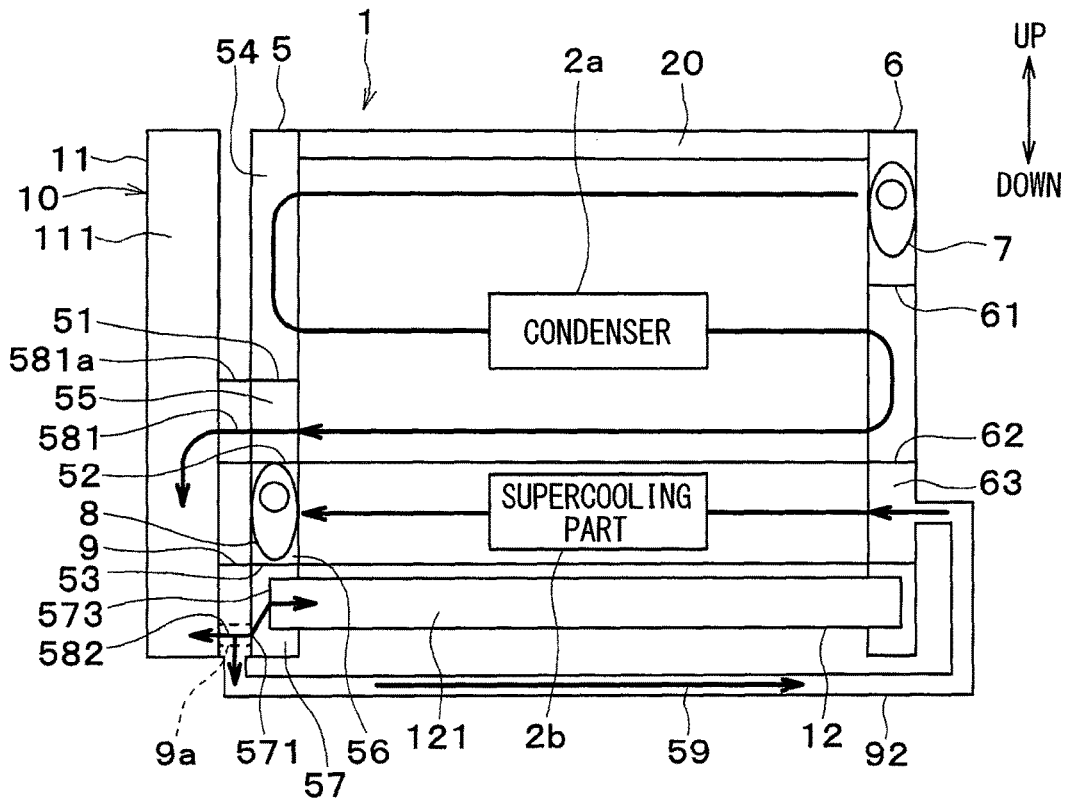
FIG. 16 is a perspective view illustrating the path of a refrigerant flow in a condenser in a seventh embodiment.

Next, the seventh embodiment in the present disclosure will be described with reference to FIG. 16. The seventh embodiment differs from the sixth embodiment in a part connected with a communication channel 92. In FIG. 16, a desiccant 11a and a filter 11b are omitted.

As shown in FIG. 16, the refrigerant inlet side of the communication channel 92 is connected with the lower end of a second communication passage 582 (i.e., through-hole 9a) of a connection member 9 in the gravity direction. The communication channel 92 according to the present embodiment connects the second communication passage 582 of the connection member 9 and the lower-end space 63 of a second header tank 6. Thus, the liquid-phase refrigerant in a communicating space 57 is guided to the lower-end space 63 of the second header tank 6 after passing through the second communication passage 582 and the communication channel 92 in this order. Therefore, in the present embodiment, the second communication passage 582 and the communication channel 92 configure the introduction passage 59.

The other configurations are identical to those in the sixth embodiment. Therefore, the condenser 1 according to the present embodiment can obtain the same effects as the condenser 1 according to the sixth embodiment.

Eighth Embodiment

Next, the eighth embodiment in the present disclosure will be described with reference to FIG. 17. The eighth embodiment differs from the first embodiment in the configuration of a first modulator tank 11.

Figure 17:
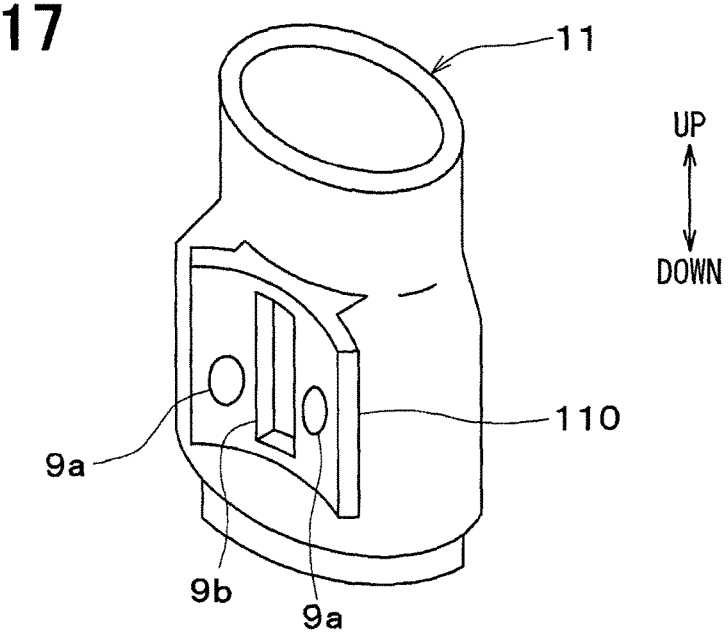
FIG. 17 is a partial enlarged perspective view illustrating a first modulator tank in a condenser in an eighth embodiment.

As shown in FIG. 17, leg parts 110 are integrally formed at both ends of the first modulator tank 11 in the gravity direction, each leg part 110 being partially joined to an external wall surface of the first header tank 5. A through-hole 9a and a groove 9b are formed in the leg part 110 disposed at the lower end of the first modulator tank 11 in the gravity direction. The leg part 110 in the present embodiment corresponds to a first-introduction-passage formation member according to the present disclosure.

According to the present embodiment, a connection member 9 and a support member 11A can be eliminated, thus allowing a reduction in the number of components. The leg part 110 may configure a part of the wall of the first header tank 5.

Ninth Embodiment

Figure 18:
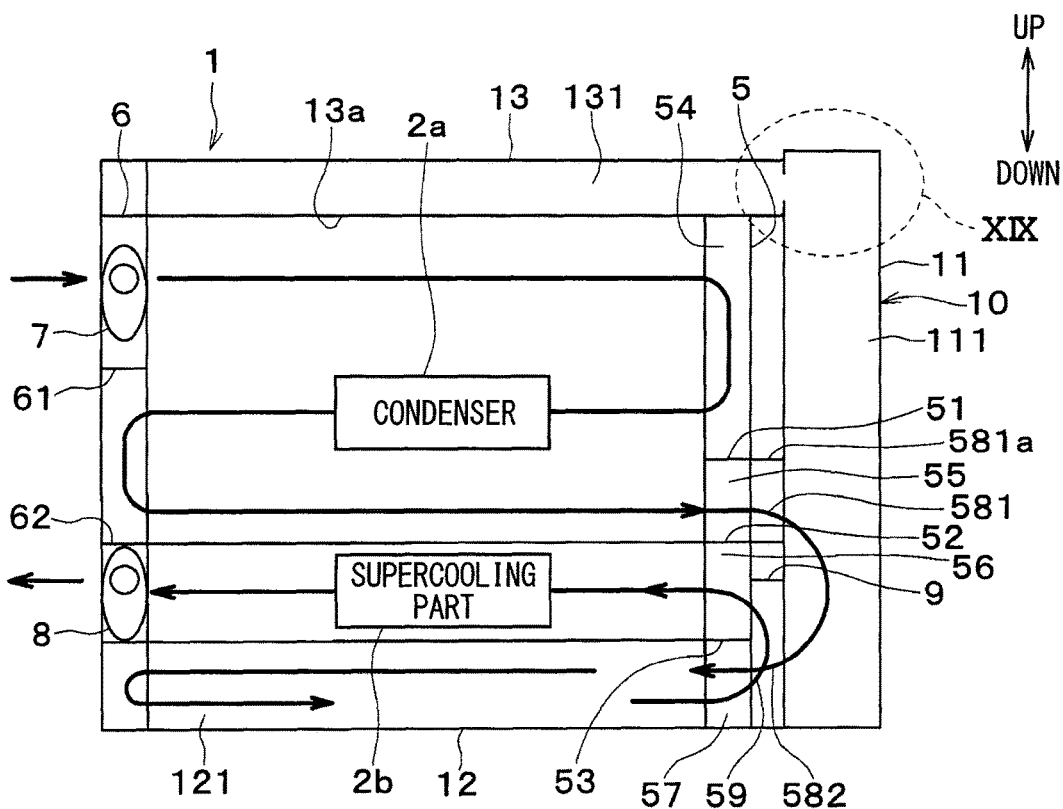
FIG. 18 is a perspective view illustrating the path of a refrigerant flow in a condenser in a ninth embodiment.

Next, the ninth embodiment in the present disclosure will be described with reference to FIG. 18 and FIG. 19. The ninth embodiment differs from the first embodiment in that a third modulator tank 13 is added. In FIG. 18, a desiccant 11a and a filter 11b are omitted.

As shown in FIG. 18, the modulator tank 10 according to the present embodiment has a U-shaped cylindrical form as viewed from the front. Specifically, a modulator tank 10 has a first modulator tank 11, a second modulator tank 12, and the third modulator tank 13 disposed on the upper edge of the condenser 1 in the direction of capacity. The internal space of the first modulator tank 11, the internal space of the second modulator 12, and the internal space of the third modulator tank 13 communicate with one another.

The third modulator tank 13 is disposed at the uppermost part of the core part 2 in the gravity direction along the upper edge of the core part 2 in the gravity direction. The third modulator tank 13 is a cylindrical body of rectangular cross-section, for example. The third modulator tank 13 has at least a flat part 13a that is a part joining the third modulator tank 13 and an outer fin 4 located in the lowermost part of the core part 2 in the gravity direction.

The third modulator tank 13 has a length over the entire core part 2 in the lateral direction of the core part 2. In other words, the third modulator tank 13 extends over the entire core part 2 in the lateral direction of the core part 2. One end of the third modulator tank 13 is connected with the upper part of the first modulator tank 11 in the gravity direction, and the other end of the third modulator tank is connected with the upper part of a second header tank 6 in the gravity direction. With this configuration, the third modulator tank 13 is supported by other members at both its ends, thus making it possible to maintain desired strength with respect to vibration and so on, and hence exhibiting a reinforcement function for the core part 2 even after the time of actual use has elapsed.

Figure 19:
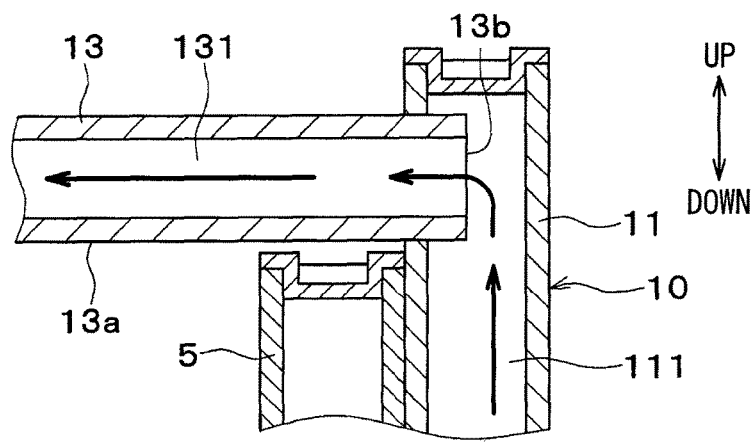
FIG. 19 is an enlarged cross-sectional view illustrating a portion XIX in FIG. 18.

More specifically, as shown in FIG. 19, the first modulator tank 11 projects higher than the first header tank 5 in the gravity direction. The third modulator tank 13 is directly connected with the first modulator tank 11. That is, the open end 13b of the cylindrical body configuring the third modulator tank 13 is disposed in the first modulator tank 11. The internal space 111 of the first modulator tank 11 and the internal space 131 of the third modulator tank 13 communicate with one another.

According to the configuration of the present embodiment, the refrigerant that has flowed into the internal space 111 of the first modulator tank 11 can flow into the internal space 131 of the third modulator tank 13. Accordingly, the entire capacity of the modulator tank 10 can be further increased, and refrigerant filling characteristics for the condenser 1 can be further improved.

Tenth Embodiment

Next, the tenth embodiment in the present disclosure will be described with reference to FIG. 20. The tenth embodiment differs from the ninth embodiment in structure for communication between a third modulator tank 13 and a first modulator tank 11.

Figure 20:
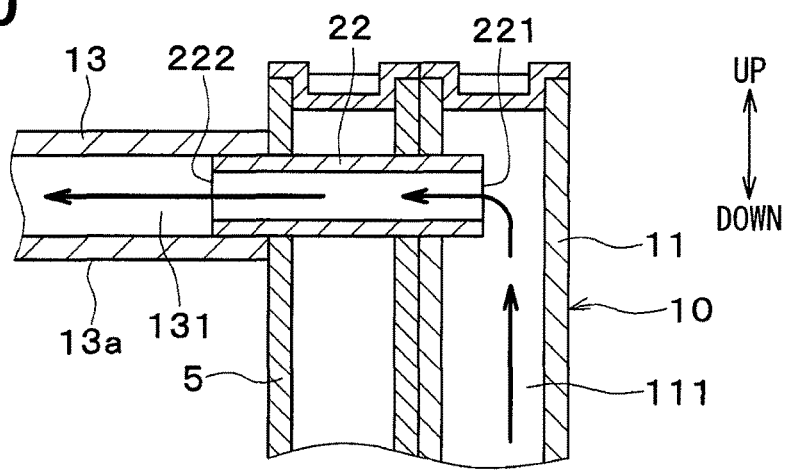
FIG. 20 is a partial enlarged cross-sectional view illustrating a condenser according to a tenth embodiment.

As shown in FIG. 20, in the present embodiment, the upper end of a first header tank 5 in the gravity direction is located at the same level as the upper end of the first modulator tank 11 in the gravity direction. The third modulator tank 13 is connected to the open end 222 of a communication member 22 having a tubular shape outside the first header tank 5. The communication member 22 passes through the first header tank 5, and the open end 221 of the communication member 22 is located in the first modulator tank 11.

With this configuration, in the first header tank 5, a through-hole having an inner diameter through which the communication member 22 can extend is formed in a wall on the core part 2 side and in a wall on the first modulator tank 11 side. In the first modulator tank 11, a through-hole having an inner diameter through which the communication member 22 can extend is formed in a wall opposite to the first header tank 5 to be in contact with or spaced from the first header tank 5.

Therefore, some refrigerant that has flowed into the first modulator tank 11 after passing through the first communication passage 581 from the first header tank 5 flows into the internal space 131 of the third modulator tank 13 after passing through the communication member 22 from the open end 221 of the communication member 22. Accordingly, the interior of the third modulator tank 13 can be utilized as a modulator space.

The other configurations are identical to those in the ninth embodiment. Therefore, the condenser 1 according to the present embodiment can obtain the same effects as the condenser 1 according to the ninth embodiment.

Eleventh Embodiment

Next, the eleventh embodiment in the present disclosure will be described with reference to FIG. 21. The eleventh embodiment differs from the ninth embodiment in structure for communication between a third modulator tank 13 and a first modulator tank 11.

Figure 21:
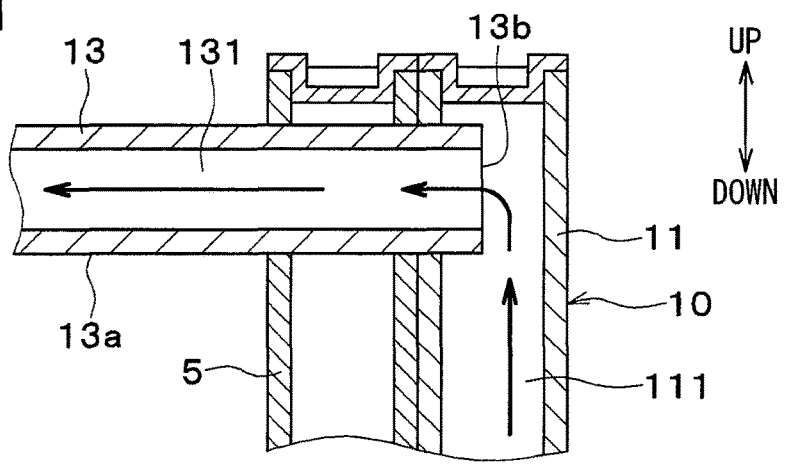
FIG. 21 is a partial enlarged cross-sectional view illustrating a condenser according to an eleventh embodiment.

As shown in FIG. 21, in the present embodiment, the upper end of a first header tank 5 in the gravity direction is located at the same level as the upper end of the first modulator tank 11 in the gravity direction. A tubular body configuring the third modulator tank 13 passes through the first header tank 5 such that the open end 13b is located in the first modulator tank 11.

With this configuration, in the first header tank 5, a through-hole having an inner diameter, through which the third modulator tank 13 can extend, is formed in a wall on the core part 2 side and in a wall on the first modulator tank 11 side. In the first modulator tank 11, a through-hole having an inner diameter, through which the third modulator tank 13 can extend, is formed in a wall opposite to the first header tank 5 to be in contact with or spaced from the first header tank 5.

Therefore, some refrigerant that has flowed into the first modulator tank 11 after passing through a first communication passage 581 from the first header tank 5 flows into an internal space 131 from the open end 13b of the third modulator tank 13. Accordingly, the interior of the third modulator tank 13 can be utilized as a modulator space.

The other configurations are identical to those in the ninth embodiment. Therefore, the condenser 1 according to the present embodiment can obtain the same effects as the condenser 1 according to the ninth embodiment.

Twelfth Embodiment

Next, the twelfth embodiment in the present disclosure will be described with reference to FIG. 22. The twelfth embodiment differs from the first embodiment in the configuration of a second modulator tank 12.

Figure 22:
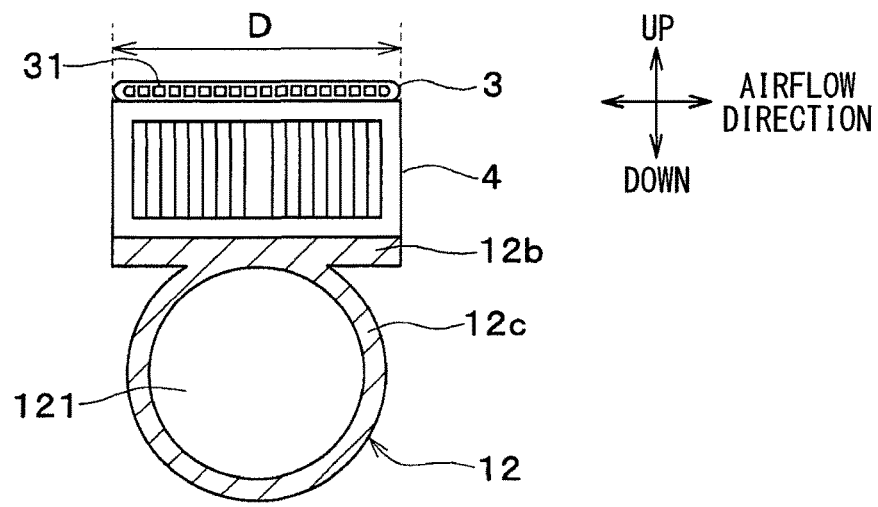
FIG. 22 is a partial cross-sectional view illustrating the respective parts of a second modulator tank and a core part in a condenser in a twelfth embodiment.

As shown in FIG. 22, the second modulator tank 12 includes a base part 12b and a cylindrical part 12c. In the base part 12b, a part to be joined with an outer fin 4 by means of brazing has a flat shape to easily ensure the area of contact with the outer fin 4. The refrigerant from the first modulator tank 11 passes through the cylindrical part 12c. The second modulator tank 12 with such a configuration is formed by extrusion, for example.

According to the present embodiment, the area of contact between the flat base part 12b and the outer fin 4 can be increased, thus making it possible to enhance a reinforcement function for the second modulator tank 12 with respect to a core part 2. The second modulator tank 12 with such a form allows use of the same component as the first modulator tank 11. Accordingly, the number of components, the number of man-hours for component management, and hence manufacturing cost can be reduced.

Thirteenth Embodiment

Next, the thirteenth embodiment in the present disclosure will be described with reference to FIG. 23. The thirteenth embodiment differs from the first embodiment in the configuration of a second modulator tank 12.

Figure 23:
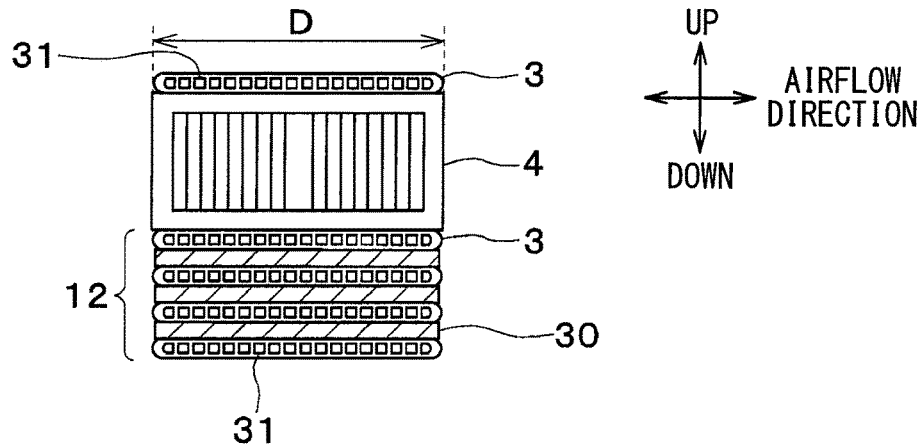
FIG. 23 is a partial cross-sectional view illustrating the respective parts of a second modulator tank and a core part in a condenser in a thirteenth embodiment.

As shown in FIG. 23, the second modulator tank 12 is configured by integrally stacking a plurality of flat tubes in layers. The plurality of tubes 3 used for the second modulator tank 12 are identical to tubes 3 constituting a core part 2.

Since the spaces between adjacent tubes 3 stacked in layers are filled with adhesive 30, the plurality of tubes 3 are formed as one tank to be in close contact with one another and integrated.

The adhesive 30 can be replaced with a clad material formed by cladding a brazing material. The clad material is disposed between adjacent tubes 3, and thus the adjacent tubes 3 are joined together via the clad material after a brazing process. Accordingly, the plurality of tubes 3 stacked in layers are integrated and form one tank.

According to the present embodiment, since the tubes 3 used in the core part 2 are used as members configuring the second modulator tank 12, the components are further shared, thus allowing a reduction in the number of components, a reduction in man-hours for component management, and hence a reduction in manufacturing cost. Since each of the tubes 3 has a flat shape, the tube 3 exhibits the same operation effects as the flat base part 12b in the twelfth embodiment, thus enhancing a reinforcement function for the second modulator tank 12 with respect to the core part 2.

Fourteenth Embodiment

Next, the fourteenth embodiment in the present disclosure will be described with reference to FIG. 24. The fourteenth embodiment differs from the first embodiment in the configuration of a second modulator tank 12.

Figure 24:
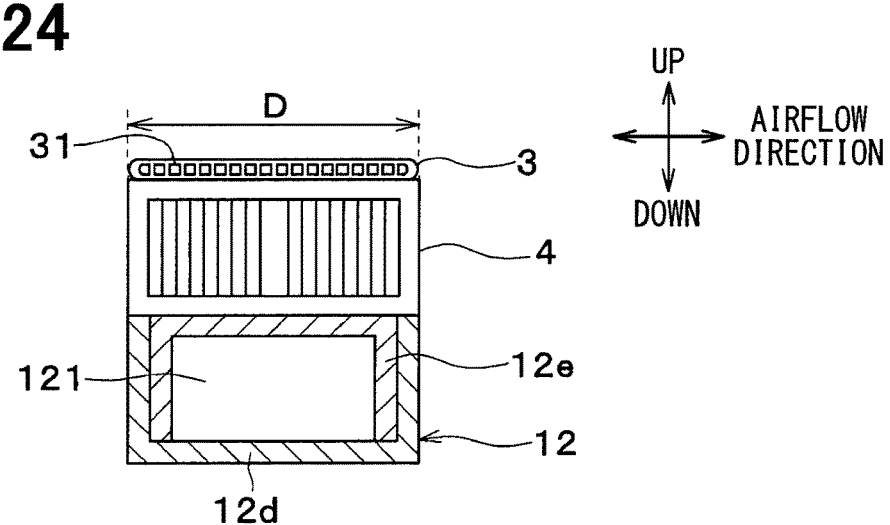
FIG. 24 is a partial cross-sectional view illustrating the respective parts of a second modulator tank and a core part in a condenser in a fourteenth embodiment.

As shown in FIG. 24, the second modulator tank 12 is formed of a combination of a plurality of members 12d, 12e formed by press working. The second modulator tank 12 is configured of the first member 12d whose cross-section perpendicular to the tube longitudinal direction is a U-shape, and the second member 12e whose cross-section is also U-shape and which is smaller than the first member 12d in outer shape. The second modulator tank 12 is combined by fitting external faces of the second member 12e on corresponding internal faces of the first member 12d, and joining these by means of brazing.

According to the present embodiment, by a simple processing method, a large contact area is obtained in the joint face between the second modulator tank 12 and an outer fin 4 and manufacturing cost can further be reduced.

Fifteenth Embodiment

Next, the fifteenth embodiment in the present disclosure will be described with reference to FIG. 25. The fifteenth embodiment differs from the fourteenth embodiment in the configuration of a second modulator tank 12.

Figure 25:
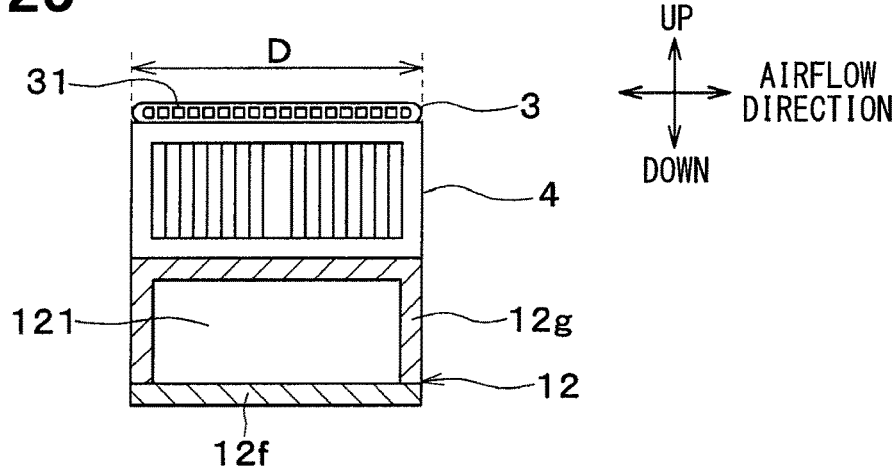
FIG. 25 is a partial cross-sectional view illustrating the respective parts of a second modulator tank and a core part in a condenser in a fifteenth embodiment.

As shown in FIG. 25, the second modulator tank 12 is formed of a combination of a plurality of members 12f, 12g formed by press working. The second modulator tank 12 is configured of the first member 12f whose cross-section perpendicular to the tube longitudinal direction is a flat shape, and the second member 12g whose cross-section is U-shape. The second modulator tank 12 is formed in such a manner that the first member 12f is placed on the open end of the U-shaped second member 12g joined to an outer fin 4 and these are joined together by means of brazing. The condenser 1 according to the present embodiment can obtain the same effects as the condenser 1 according to the fourteenth embodiment.

Sixteenth Embodiment

Next, the sixteenth embodiment in the present disclosure will be described with reference to FIG. 26. The sixteenth embodiment differs from the fourteenth embodiment in the configuration of a second modulator tank 12.

Figure 26:
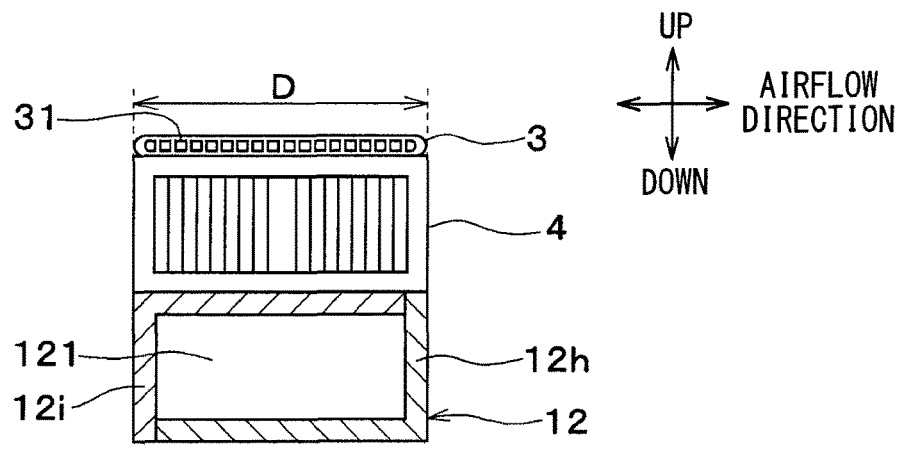
FIG. 26 is a partial cross-sectional view illustrating the respective parts of a second modulator tank and a core part in a condenser in a sixteenth embodiment.

As shown in FIG. 26, the second modulator tank 12 is formed of a combination of a plurality of members 12h, 12i formed by press working. The second modulator tank 12 is configured of the first member 12h whose cross-section perpendicular to the tube longitudinal direction is an L-shape, and the second member 12i whose cross-section is also an L-shape. The second modulator tank 12 is formed in such a combining manner that the L-shaped first member 12h is placed in an inverted position on the L-shaped second member 12i joined to an outer fin 4 and these are joined together by means of brazing. In other words, the first member 12h and the second member 12i are brazed such that the short side end of the first member 12h and the long side end of the second member 12i are combined and the long side end of the first member 12h and the short side end of the second member 12i are combined. The condenser 1 according to the present embodiment can obtain the same effects as the condenser 1 according to the fourteenth embodiment.

Seventeenth Embodiment

Next, the seventeenth embodiment in the present disclosure will be described with reference to FIG. 27. The seventeenth embodiment differs from the first embodiment in the configuration of a second modulator tank 12.

Figure 27:
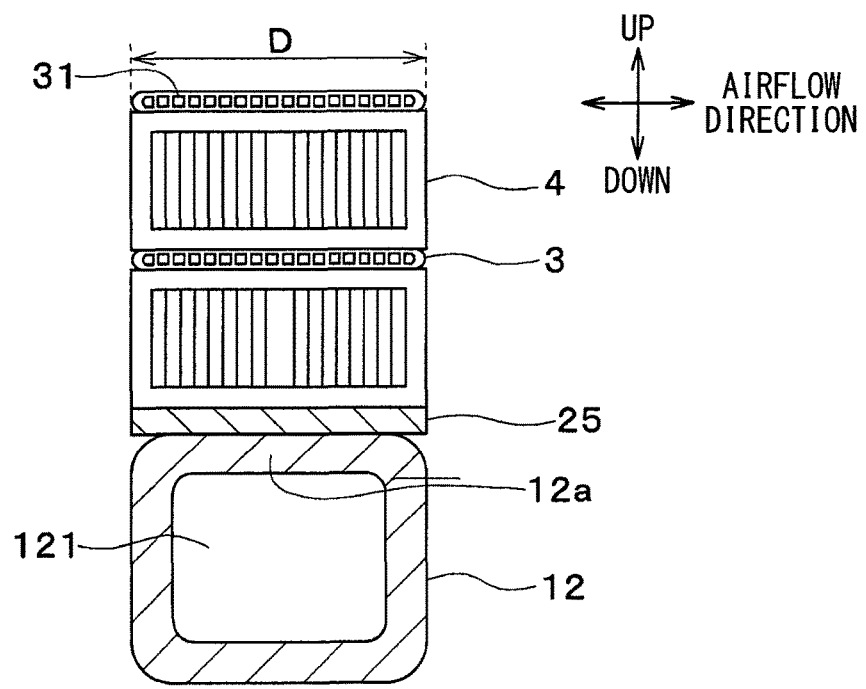
FIG. 27 is a partial cross-sectional view illustrating the respective parts of a second modulator tank and a core part in a condenser in a seventeenth embodiment.

As shown in FIG. 27, a plate-like member 25 is provided between the second modulator tank 12 and an outer fin 4. The outer fin 4 is joined to the one side of the plate-like member 25, and the flat part 12a of the second modulator tank 12 is joined to the other side of the plate-like member 25. The length of the plate-like member 25 in the airflow direction is identical to the thickness D of a core part 2.

The other configurations are identical to those in the first embodiment. Therefore, the condenser 1 according to the present embodiment can obtain the same effects as the condenser 1 according to the first embodiment.

(Other Modifications)

It should be understood that the present disclosure is not limited to the above-described embodiments and intended to cover various modification within a scope of the present disclosure as described hereafter. Technical features disclosed in the above-described embodiments may be combined as required in a feasible range.

(1) In each of the foregoing embodiments, the second modulator tank 12 is provided over the entire length of the core part 2 in the tube longitudinal direction. However, the present disclosure is not limited by this. For example, the second modulator tank 12 may be joined to the outer fin 4 over part of the core part 2 to reinforce the core part 2.

(2) A description has been given using an example in which each of the members configuring the condenser in each of the foregoing embodiments is formed of aluminum or aluminum alloy. However, each member may be formed of iron, copper, or stainless, or the alloy thereof.

(3) In each of the foregoing embodiments, the tube 3 has a porous tube structure formed by extrusion. However, a structure in which an inner fin is provided in a tube 3 may be employed. The inner fin is a corrugated member, in which furrows and ridges are alternately formed in series, and is joined to the internal wall surface of the tube 3 by brazing. In addition, the present disclosure can also be applied in a condenser that has a tube provided with no inner fin.

Figure 28:
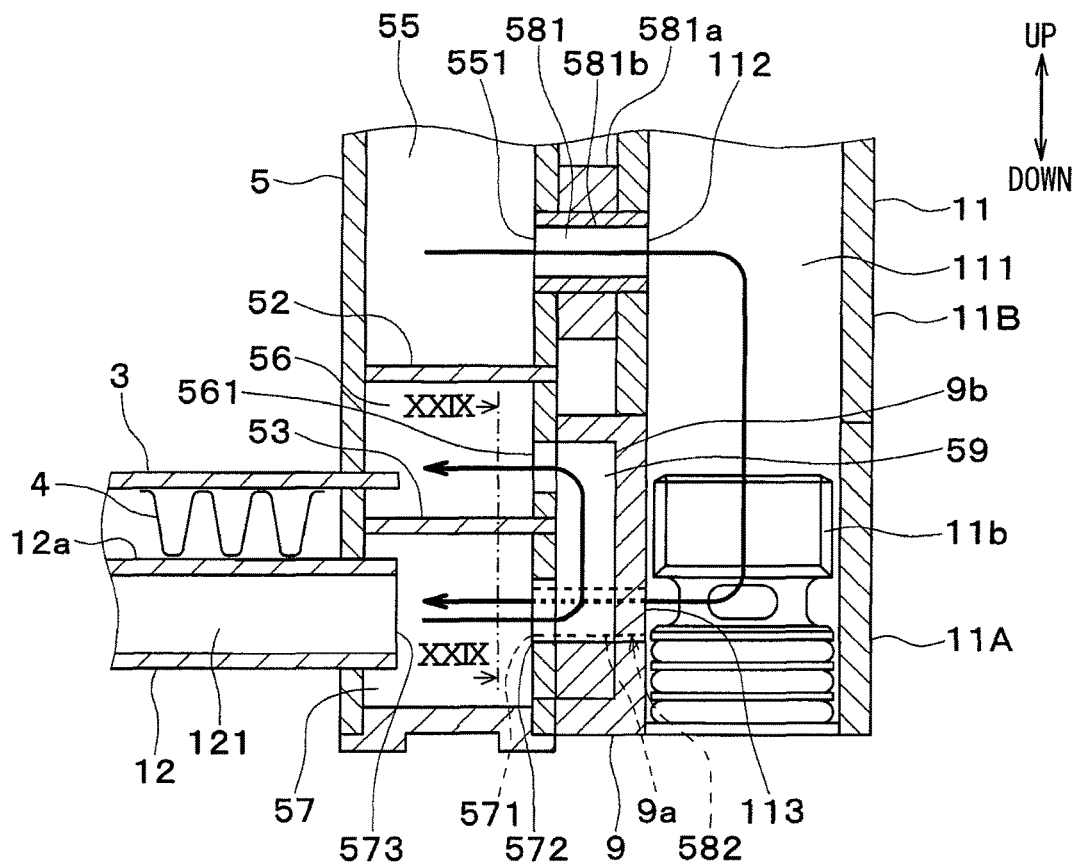
FIG. 28 is a partial enlarged cross-sectional view illustrating a condenser according to a modified example.
Figure 29:
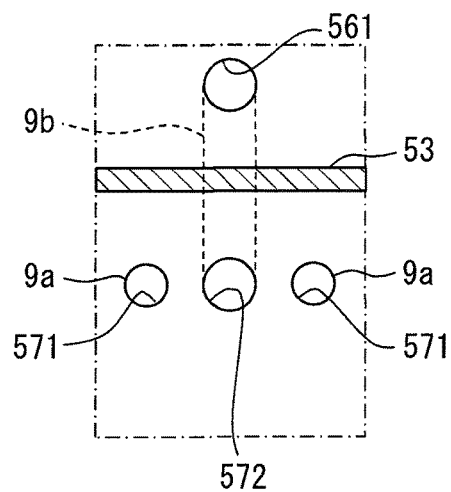
FIG. 29 is a cross-sectional view taken along a line XXIX-XXIX in FIG. 28.

(4) In each of the foregoing embodiments, the refrigerant outflow port 572 is disposed lower than the refrigerant inflow port 571 in the gravity direction (see FIG. 5 and so on). However, as shown in FIG. 28 and FIG. 29, the refrigerant outflow port 572 may be located at the same level as the refrigerant inflow port 571 in the gravity direction. The concept of the same level in the gravity direction includes, in addition to exactly the same level in the gravity direction, the position in which the refrigerant outflow port 572 is slightly displaced from the refrigerant inflow port 571 in the gravity direction to such a degree that part of the refrigerant outflow port 572 is located between two refrigerant inflow ports 571.

What is claimed is:

1. A condenser comprising:
a core part that is formed by stacking a plurality of tubes in which a refrigerant in a refrigeration cycle flows, and that exchanges heat between the refrigerant and an external fluid flowing outside the plurality of tubes;
a header tank that is disposed at an end of the plurality of tubes in a longitudinal direction of the plurality of tubes, and that extends in a direction perpendicular to the longitudinal direction of the plurality of tubes so as to be in fluid communication with the plurality of tubes;
a first modulator tank that is in fluid communication with an interior of the header tank to allow the refrigerant from the header tank to flow into the first modulator tank, and that is provided along the header tank on one side of the header tank in the longitudinal direction of the plurality of tubes; and
a second modulator tank that is in fluid communication with an interior of the first modulator tank and is provided along a lower edge of the core part in a gravity direction, wherein
the first modulator tank and the second modulator tank separate the refrigerant flowing into the modulator tanks into a gas-phase refrigerant and a liquid-phase refrigerant, and store an excess refrigerant in the refrigeration cycle,
the header tank defines a communicating space therein that is in fluid communication with the interior of the first modulator tank and an interior of the second modulator tank,
the liquid-phase refrigerant separated by at least one of the first modulator tank and the second modulator tank flows into the communicating space,
the core part has a supercooling portion that supercools the liquid-phase refrigerant by exchanging heat between the liquid-phase refrigerant and the external fluid,
the communicating space defined in the header tank and the supercooling portion of the core part are in fluid communication with each other via an introduction passage,
the introduction passage guides the liquid-phase refrigerant in the communicating space to flow into the supercooling portion,
the communicating space and the introduction passage are in fluid communication with each other via a first connection part,
the communicating space and the second modulator tank are in fluid communication with each other via a second connection part, and
the first connection part is located at a position which is lower relative to the second connection part in the gravity direction.

2. The condenser according to claim 1, wherein
the communicating space and the first modulator tank are in fluid communication with each other via a third connection part, and
the third connection part is located at a position which is lower relative to the second connection part in the gravity direction.

3. The condenser according to claim 1, wherein
the core part has a condensing portion that condenses the refrigerant by exchanging heat between the refrigerant and the external fluid,
the header tank defines the communicating space, a condensing-side space and a supercooling-side space therein, the condensing-side space is in fluid communication with the condensing portion, the supercooling-side space is in fluid communication with the supercooling portion,
the header tank includes:
a first partition member dividing the condensing-side space and the supercooling-side space from each other; and
a second partition member dividing the supercooling-side space and the communicating space from each other,
a tubular member is disposed in the header tank to pass through both the first partition member and the second partition member, and
the tubular member allows the refrigerant to flow therethrough from the condensing-side space into the communicating space.

4. The condenser according to claim 2, wherein
the first connection part is located at a position which is the same level as the third connection part in the gravity direction or at a position which is lower relative to the third connection part in the gravity direction.

5. The condenser according to claim 1, wherein
the header tank defining the communication space therein is one of first and second header tanks positioned at one end and an other end of the plurality of tubes in the longitudinal direction respectively,
the header tank is the first header tank,
the communicating space is located in a lower end portion of the first header tank in the gravity direction,
the first header tank is provided with a refrigerant outlet that discharges, to an outside of the first header tank, the liquid-phase refrigerant supercooled by the supercooling portion, and
a lower end portion of the first modulator tank in the gravity direction is connected with a refrigerant inlet side of a communication channel, and
the communication channel forms a part of the introduction passage and guides the refrigerant to flow from the communicating space into an internal space of the second header tank.

6. The condenser according to claim 5, further comprising
a communication passage through which the communicating space of the first header tank and the interior of the first modulator tank is in fluid communication with each other, wherein
the refrigerant inlet side of the communication channel is connected with a lower end portion of the communication passage in the gravity direction.

7. The condenser according to claim 1, further comprising
an introduction-passage formation member that is provided outside the header tank and forms the introduction passage, wherein
the introduction-passage formation member is formed integrally with the first modulator tank.

8. The condenser according to claim 1, further comprising
an introduction-passage formation member that is formed separately from the header tank and the first modulator tank and is interposed between the header tank and the first modulator tank, wherein
the introduction-passage formation member defines the introduction passage therein.

9. The condenser according to claim 1, further comprising
a third modulator tank that is in fluid communication with the interior of the first modulator tank and that is provided along an upper edge of the core part in the gravity direction, wherein
the third modulator tank separates the refrigerant flowing into the tank into gas and liquid and stores an excess refrigerant in the refrigeration cycle.

10. The condenser according to claim 1, wherein
the core part includes the plurality of tubes and a plurality of fins that are stacked alternately with the tubes,
the second modulator tank is joined to one of the fins that is located at an end of the tubes in the core part in a stack direction, and
the second modulator tank includes:
a base part having a joint portion that has a flat shape and is coupled with the one of the fins; and
a cylindrical part through which the refrigerant from the first modulator tank passes.

11. The condenser according to claim 1, wherein
the second modulator tank is configured by a plurality of tubes that are stacked to be a single body, and
the plurality of tubes have the same structure as the plurality of tubes forming the core part.

12. The condenser according to claim 1, wherein
the second modulator tank is formed by combining a plurality of members formed by press working.

13. The condenser according to claim 9, wherein
a cylindrical body configuring the third modulator tank passes through the header tank and has an open end located in the first modulator tank, and
the interior of the first modulator tank and an interior of the third modulator tank are in fluid communication with each other to allow the refrigerant to flow from the interior of the first modulator tank into the interior of the third modulator tank.

14. The condenser according to claim 9, further comprising
a communication member that has a tubular shape and is connected with the third modulator tank, wherein
the communication member passes through the header tank, and an open end of the communication member is located in the first modulator tank, and
the interior of the first modulator tank and an interior of the third modulator tank are in fluid communication with each other via the communication member, and the refrigerant flows from the interior of the first modulator tank to the interior of the third modulator tank.

15. The condenser according to claim 9, wherein
the third modulator tank is formed of a cylindrical body that passes through the header tank and that has an open end located in the first modulator tank, and
the interior of the first modulator tank and an interior of the third modulator tank are in fluid communication with each other, and the refrigerant flows from the interior of the first modulator tank into the interior of the third modulator tank.

16. A condenser comprising:
a core part that is formed by stacking a plurality of tubes in which a refrigerant in a refrigeration cycle flows, and that exchanges heat between the refrigerant and an external fluid flowing outside the plurality of tubes;
a header tank that is disposed at an end of the plurality of tubes in a longitudinal direction of the plurality of tubes, and that extends in a direction perpendicular to the longitudinal direction of the plurality of tubes so as to be in fluid communication with the plurality of tubes;
a first modulator tank that is in fluid communication with an interior of the header tank to allow the refrigerant from the header tank to flow into the first modulator tank, and that is provided along the header tank on one side of the header tank in the longitudinal direction of the plurality of tubes; and
a second modulator tank that is in fluid communication with an interior of the first modulator tank and is provided along a lower edge of the core part in a gravity direction, wherein
the first modulator tank and the second modulator tank separate the refrigerant flowing into the modulator tanks into a gas-phase refrigerant and a liquid-phase refrigerant, and store an excess refrigerant in the refrigeration cycle,
the header tank defines a communicating space therein that is in fluid communication with the interior of the first modulator tank and an interior of the second modulator tank, the liquid-phase refrigerant separated by at least one of the first modulator tank and the second modulator tank flows into the communicating space, the core part has a supercooling portion that supercools the liquid-phase refrigerant by exchanging heat between the liquid-phase refrigerant and the external fluid, the communicating space defined in the header tank and the supercooling portion of the core part are in fluid communication with each other via an introduction passage, the introduction passage guides the liquid-phase refrigerant in the communicating space to flow into the supercooling portion, the communicating space and the introduction passage are in fluid communication with each other via a refrigerant inflow port, the communicating space and the second modulator tank are in fluid communication with each other via a second connection part, the first connection part is located at a position which is lower relative to the second connection part in the gravity direction, the core part has a condensing portion that condenses the refrigerant by exchanging heat between the refrigerant and the external fluid, the interior of the header tank defines the communicating space, a condensing-side space and a supercooling-side space therein, the condensing-side space is in fluid communication with the condensing portion, the supercooling-side space is in fluid communication with the supercooling portion, the header tank includes:

the first partition member dividing the condensing-side space and the supercooling-side space from each other; and the second partition member dividing the supercooling-side space and the communicating space from each other, a tubular member is disposed in the header tank to pass through the second partition member, the tubular member allows the refrigerant to flow therethrough from the communicating space into the supercooling-side space, and the tubular member forms at least a part of the introduction passage.

* * * * *